(12) United States Patent
Fulger et al.

(10) Patent No.: US 9,830,815 B2
(45) Date of Patent: Nov. 28, 2017

(54) NAVIGATION APPARATUS AND METHOD

(75) Inventors: Daniel Fulger, Duisburg (DE); Peter Mieth, Berlin (DE); Steffen Gunther Wiesner, Berlin (DE)

(73) Assignee: TOMTOM NAVIGATION B.V., Amsterdam (NL)

( * ) Notice: Subject to any disclaimer, the term of this patent is extended or adjusted under 35 U.S.C. 154(b) by 0 days.

(21) Appl. No.: 13/884,029

(22) PCT Filed: Nov. 8, 2011

(86) PCT No.: PCT/EP2011/069655
§ 371 (c)(1),
(2), (4) Date: Jul. 22, 2013

(87) PCT Pub. No.: WO2012/062760
PCT Pub. Date: May 18, 2012

(65) Prior Publication Data
US 2013/0304379 A1    Nov. 14, 2013

(30) Foreign Application Priority Data

Nov. 8, 2010   (GB) .................................. 1018815.9
Sep. 30, 2011  (GB) .................................. 1116925.7

(51) Int. Cl.
*G01C 21/34* (2006.01)
*G08G 1/0967* (2006.01)
(Continued)

(52) U.S. Cl.
CPC ... *G08G 1/096775* (2013.01); *G01C 21/3415* (2013.01); *G01C 21/3453* (2013.01);
(Continued)

(58) Field of Classification Search
CPC .................................. G06F 19/00; G01C 21/34
(Continued)

(56) References Cited

U.S. PATENT DOCUMENTS 5,913,917 A * 6/1999 Murphy .................... 701/123
6,012,013 A   1/2000 McBurney
(Continued)

FOREIGN PATENT DOCUMENTS

CN     1536514 A    10/2004
CN   101836079 A     9/2010
(Continued)

OTHER PUBLICATIONS

International Search Report dated Feb. 22, 2012 for International Application No. PCT/EP2011/069655.
(Continued)

*Primary Examiner* — Todd Melton
*Assistant Examiner* — Jason Roberson

(57) ABSTRACT

A navigation apparatus 200 comprises a processing resource 260 configured to: determine a route to a selected destination; obtain weather-related data; and modify speed data for a plurality of route segments in dependence on the weather-related data. For each route there is a respective classifier that classifies the road type for the route segment, and the processing resource is configured to modify the speed data for each route segment based on the weather-related data and the road type represented by the classifier for that route segment.

20 Claims, 9 Drawing Sheets

Contours restored from the full set of coefficients

(51) Int. Cl.
  *G01C 21/36* (2006.01)
  *G08G 1/0968* (2006.01)
  *H04L 29/08* (2006.01)
  *H04W 4/02* (2009.01)

(52) U.S. Cl.
  CPC ..... *G01C 21/3492* (2013.01); *G01C 21/3691* (2013.01); *G08G 1/0967* (2013.01); *G08G 1/096827* (2013.01); *G08G 1/096844* (2013.01); *H04L 67/18* (2013.01); *H04W 4/02* (2013.01)

(58) Field of Classification Search
  USPC ......... 701/117, 118, 415, 416, 423; 340/936
  See application file for complete search history.

(56) References Cited

U.S. PATENT DOCUMENTS

| | | | |
|---|---|---|---|
| 6,122,593 | A | 9/2000 | Friederich et al. |
| 6,178,374 | B1 | 1/2001 | Mohlenkamp et al. |
| 6,181,020 | B1 | 1/2001 | Uchida et al. |
| 6,188,943 | B1 | 2/2001 | Uchida et al. |
| 6,317,686 | B1 * | 11/2001 | Ran ............... 701/533 |
| 6,401,027 | B1 | 6/2002 | Xu et al. |
| 6,567,744 | B1 | 5/2003 | Katayama et al. |
| 6,587,777 | B1 | 7/2003 | St. Pierre |
| 6,615,130 | B2 | 9/2003 | Myr |
| 6,621,452 | B2 | 9/2003 | Knockeart et al. |
| 6,707,421 | B1 | 3/2004 | Drury et al. |
| 6,812,888 | B2 | 11/2004 | Drury et al. |
| 6,990,401 | B2 | 1/2006 | Neiss et al. |
| 7,050,903 | B1 | 5/2006 | Shutter et al. |
| 7,079,946 | B2 | 7/2006 | Hunzinger |
| 7,266,443 | B2 | 9/2007 | Hirose |
| 7,366,606 | B2 | 4/2008 | Uyeki |
| 7,375,649 | B2 | 5/2008 | Gueziec |
| 7,512,489 | B2 | 3/2009 | Endo et al. |
| 7,516,041 | B2 | 4/2009 | Smartt et al. |
| 7,630,986 | B1 | 12/2009 | Herz et al. |
| 7,774,121 | B2 | 8/2010 | Lee et al. |
| 7,957,893 | B2 | 6/2011 | Smartt |
| 8,063,755 | B2 | 11/2011 | Eikelenberg et al. |
| 8,332,132 | B2 | 12/2012 | Groenhuijzen et al. |
| 2001/0029425 | A1 | 10/2001 | Myr |
| 2002/0082771 | A1 | 6/2002 | Anderson et al. |
| 2004/0030670 | A1 | 2/2004 | Barton |
| 2004/0034467 | A1 | 2/2004 | Sampedro et al. |
| 2004/0104842 | A1 | 6/2004 | Drury et al. |
| 2004/0225437 | A1 * | 11/2004 | Endo et al. ............ 701/209 |
| 2004/0230373 | A1 | 11/2004 | Tzamaloukas |
| 2005/0027434 | A1 | 2/2005 | Hirose |
| 2005/0093720 | A1 | 5/2005 | Yamane et al. |
| 2005/0206534 | A1 | 9/2005 | Yamane |
| 2005/0222751 | A1 | 10/2005 | Uyeki |
| 2006/0106531 | A1 | 5/2006 | Nagase et al. |
| 2006/0178807 | A1 | 8/2006 | Kato et al. |
| 2006/0206256 | A1 | 9/2006 | Kumagai et al. |
| 2007/0106465 | A1 | 5/2007 | Adam et al. |
| 2007/0162222 | A1 | 7/2007 | Endo et al. |
| 2007/0208496 | A1 | 9/2007 | Downs et al. |
| 2007/0208501 | A1 * | 9/2007 | Downs et al. ............ 701/119 |
| 2007/0296575 | A1 * | 12/2007 | Eisold ............ G08B 27/008 340/539.16 |
| 2008/0004789 | A1 * | 1/2008 | Horvitz et al. ............ 701/117 |
| 2008/0234921 | A1 * | 9/2008 | Groenhuijzen et al. ...... 701/118 |
| 2009/0088965 | A1 * | 4/2009 | Burckart ............ G01C 21/3492 701/533 |
| 2009/0287405 | A1 | 11/2009 | Liu et al. |
| 2010/0161222 | A1 | 6/2010 | Zhang |
| 2010/0250127 | A1 | 9/2010 | Hilbrandie et al. |
| 2010/0253541 | A1 | 10/2010 | Seder et al. |
| 2010/0253542 | A1 | 10/2010 | Seder et al. |
| 2010/0312472 | A1 | 12/2010 | Hilbrandie et al. |
| 2011/0055210 | A1 | 3/2011 | Meredith et al. |

FOREIGN PATENT DOCUMENTS

| | | | |
|---|---|---|---|
| CN | 101836083 | A | 9/2010 |
| CN | 101846522 | A | 9/2010 |
| DE | 10037827 | A1 | 2/2002 |
| DE | 102006010572 | A1 | 9/2007 |
| DE | 2007037938 | A1 * | 2/2009 ............ G01C 21/34 |
| DE | 102007037938 | A1 | 2/2009 |
| EP | 1005627 | B1 | 10/2003 |
| EP | 1503355 | A1 | 2/2005 |
| EP | 1657692 | A1 | 5/2006 |
| EP | 1840519 | A2 | 10/2007 |
| FR | 2900728 | A1 | 11/2007 |
| GB | 2431261 | A | 4/2007 |
| JP | 07129893 | A | 5/1995 |
| JP | 2002206936 | A | 7/2002 |
| JP | 2003294470 | A | 10/2003 |
| JP | 2005017151 | A | 1/2005 |
| JP | 2005038447 | A | 2/2005 |
| JP | 2005201793 | A | 7/2005 |
| JP | 2006138742 | A | 6/2006 |
| JP | 2006184084 | A | 7/2006 |
| JP | 2006329712 | A | 12/2006 |
| JP | 2007047034 | A | 2/2007 |
| JP | 2007226845 | A | 9/2007 |
| JP | 2008039676 | A | 2/2008 |
| JP | 2009031039 | A | 2/2009 |
| JP | 2009036996 | A | 2/2009 |
| WO | 99/09374 | A1 | 2/1999 |
| WO | 02/01532 | A1 | 1/2002 |
| WO | 0208922 | A1 | 1/2002 |
| WO | 2007042796 | A1 | 4/2007 |

OTHER PUBLICATIONS

A Tutorial on Clustering Algorithms, 3pages, dated Aug. 11, 2007 via wayback machine, available online @ http://web.archive.org/web/20070811043338/http ://home.dei.polimi.it/matteucc/Clustering/tutorial_html/, last accessed Jun. 5, 2012.

Standard Deviation Definition, 2pages, May 8, 2005 available online @ http://web.archive.org/web/20050208112010/http://www.chemicool.com/definition/standard_deviation .html, last accessed Jun. 5, 2012.

Bekir, Bailin, A Clustering Based Methodology for Determining the Optical Roadway Configuration of Detectors for Travel Time Estimation, Transportation Research Board 2007 Annual Meeting, Submitted to the 86th Transportation Research Board Annual Meeting, Aug. 1, 2006, found online at www.rits.rutgers.edu/files/clusteringpaper.pdf, see pp. 1-13.

International Search Report dated Feb. 18, 2009 for International Application No. PCT/EP2008/064317.

International Search Report dated Feb. 4, 2009 for International Application No. PCT/EP2008/064318.

International Search Report dated Feb. 11, 2009 for International Application No. PCT/EP2008/064319.

International Search Report dated Mar. 23, 2009 for International Application No. PCT/EP2008/064320.

International Search Report dated Feb. 4, 2009 for International Application No. PCT/EP2008/064322.

International Search Report dated Mar. 23, 2009 for International Application No. PCT/EP2008/064323.

\* cited by examiner

Contours restored from a fraction of the coefficients

NAVIGATION APPARATUS AND METHOD

CROSS-REFERENCES TO RELATED APPLICATIONS

This application is the National Stage of International Application No. PCT/EP2011/069655 filed Nov. 8, 2011 and designating the United States. The application claims priority under 35 U.S.C. §119 to United Kingdom Patent Application No. 1018815.9 filed Nov. 8, 2010 and United Kingdom Patent Application No. 1116925.7 filed Sep. 30, 2011. The entire contents of these applications are incorporated herein by reference.

FIELD OF THE INVENTION

The present invention relates to a navigation apparatus, system and method, for example a navigation apparatus, system and method that is able to take into account weather-related data when performing navigation functions.

BACKGROUND TO THE INVENTION

Portable computing devices, for example Portable Navigation Devices (PNDs) that include GPS (Global Positioning System) signal reception and processing functionality are well known and are widely employed as in-car or other vehicle navigation systems.

The utility of such PNDs is manifested primarily in their ability to determine a route between a first location (usually a start or current location) and a second location (usually a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

The PND determines the route based upon stored geographical data, usually in the form of a digital map. The stored geographical data can include data concerning a wide variety of features, for example the position and characteristics of roads or other thoroughfares, the position and characteristics of points of interest, and the position and characteristics of geographical features, for example rivers, coastlines, or mountains.

In operation, most PNDs periodically log their own position as a function of time, for example every five seconds. PNDs can also log other, associated data such as speed or direction of travel as a function of time. The data logged by PNDs or other portable computing devices, can be referred to as probe data. It is known to obtain probe data from a large number of PNDs or other portable computing devices, and to process the probe data in order to verify or supplement existing geographical data, for example existing digital maps.

Roads or other routes can be represented in a digital map by separate segments. The digital map can include speed data that represents the expected speed of travel over each segment of a road or other route. Such speed data is obtained from expected average travel speeds over roads of different types or is obtained from probe data representing actual travel of large numbers of vehicles over each road or other route in the digital map.

The speed data can be used in known systems to determine the fastest route to a particular destination, to plan routes and/or to determine an estimated time of arrival (ETAs) at the destination. An example of a system that uses speed data in such a way is the IQ Routes (RTM) system produced by TomTom International B.V.

Whilst speed data can be used to calculate preferred routes and ETAs, the accuracy of such calculations can be hindered due to the unpredictability of traffic. Speed profiles obtained from probe data usually represent long term averages, averaged over periods longer than many types of traffic fluctuations. Local short-lived events or fluctuations of traffic can invalidate, or render inaccurate, a specific speed profile of a road segment. For example, one such event is bad weather, which can easily double ETAs.

Although it is known, e.g. from US 2010/00161222 and WO 02/08922, to transmit weather data to a navigation device, and to use the weather data, for example, to calculate ETAs and plan driving routes to avoid any region that has a weather condition higher than a threshold value, the Applicant believes that there remains scope for improvements in respect of taking into account weather-related data when performing navigation functions.

SUMMARY OF THE INVENTION

In a first aspect of the invention there is provided a navigation apparatus comprising a processing resource configured to determine a route to a selected destination, to obtain weather-related data and to modify speed data for a plurality of route segments in dependence on the weather-related data, wherein for each route segment there is a respective classifier that classifies the road type for the route segment, and the processing resource is configured to modify the speed data for each route segment based on the weather-related data and the road type represented by the classifier for that route segment.

By modifying speed data based upon weather-related data, the effects of weather on route planning, estimated time of arrival and other navigation functions can be determined by the navigation apparatus, providing for more accurate operation of the navigation apparatus. The use of classifiers can provide for more accurate determination of the effect of weather conditions on speed of travel for different road types. For example, different roads in the same region that are experiencing the same weather conditions may react differently to the weather conditions, which can be taken into account by the use of road type classifiers.

The speed data for a route segment may be representative of the expected speed of travel along the route segment, and the processing resource is configured to modify the expected speed of travel in dependence on the weather-related data.

The speed data may be determined based on probe data, e.g. a plurality of time-stamped positions representing the movements of a plurality of navigation devices.

Each classified road type may represent a respective level of sensitivity to at least one weather condition.

The weather-related data may comprise weather-related data for a plurality of different times, and the processing resource may be configured to determine, for at least one segment of the route, an expected time of arrival for that segment and to use the weather-related data for that expected time of arrival to modify the speed data for that segment.

The navigation device may comprise a data store storing the speed data for a plurality of route segments. The data store may store, for each route segment, a respective classifier that classifies the road type for the route segment, and the processing resource, for each segment, may modify the speed for that segment based on the weather-related data and the road type represented by the classifier.

The weather-related data obtained by the mobile device may comprise a plurality of sub-sets of weather-related data, each sub-set of weather-related data being specific to a respective one of the road types, and the processing resource, for each route segment, may select a sub-set of weather-related data based on the road type represented by the classifier for that route segment.

The weather-related data may comprise data representative of expected weather conditions as a function of location, wherein the weather conditions comprise, for example, one or more of: presence or amount of precipitation, for example rain, hail sleet or snow; wind speed and direction; presence or amount of lying snow; presence or amount of ice; level of visibility; presence or amount of fog; and temperature.

The weather-related data may comprise speed modification data, for example speed modification factor data, representative of the expected modification of speed due to weather conditions. The modification usually comprises a reduction but in some cases an increase in speed compared to normal due to weather conditions may occur.

The weather-related data may comprise at least one set of contour data, each set of contour data representative of a respective area of equal weather conditions or speed modification factor, and the processing resource may be configured to determine the weather-related data for a route segment from the position of the route segment and the contour data for that position.

The use of contour data can provide for particularly efficient data storage, transmission and processing, and can result in reduced data transmission and storage requirements. That can be particularly beneficial in the context of a portable device that may have limited storage or communication capacity. For example, the use of contour data can be particularly beneficial in relation to a navigation apparatus that has a limited bandwidth communication link.

The weather-related data may comprise a parametric representation, for example a transform or fit, and the processing resource may be configured to extract weather-related data from the parametric representation.

The use of a parametric representation can also provide for efficient data storage, transmission and processing, and again can be particularly beneficial in the context of a portable device that may have limited storage or communication capacity.

The processing resource may be configured to determine an estimated time of arrival at the destination, and to modify the estimated time of arrival based on the modified speed data. It is been found that weather conditions can have a significant effect on time of travel to a destination, and the provision of an apparatus that can determine expected modification of estimated time of arrival in view of actual or expected weather conditions pertaining on the route to the destination can be particularly useful for a user.

The processing resource may be configured to calculate a route to the selected destination in dependence on expected speed of travel, and to recalculate the route in response to the modification of the speed data.

It has been found that actual or expected weather conditions pertaining to the possible routes to a destination can have a significant impact on the determination of optimum routes to the destination, and the provision of an apparatus that can take into account automatically the effects of such weather conditions on route planning can be particularly beneficial to a user.

The processing resource may be configured to modify the estimated time of arrival or to recalculate the route in dependence on a variation of the weather-related data over a period of time.

The processing resource may be configured to repeatedly receive updated weather-related data and to repeatedly modify the estimated time of arrival or repeatedly recalculate the route.

The weather-related data may indicate that a segment is expected to be impassable. If a segment is expected to be impassable then it may be blocked or filtered by the apparatus so that it is no longer used in subsequent navigation operations, for example route planning, until such time as the segment becomes passable again.

The processing resource may be configured to generate an alert signal in response to determining that a segment is expected to be impassable and/or in response to the occurrence of a particular weather type or the occurrence of a weather type of at least a predetermined severity.

The processing resource may be configured to recalculate a route in response to determining that a segment is expected to be impassable and/or in response to the occurrence of a particular weather type and/or the occurrence of a weather type of at least a predetermined severity.

The processing resource may be configured to exclude at least one road segment or at least one region from a route calculation process in response to determining from the weather-related data that at the least one segment is expected to be impassable and/or in response to the occurrence of a particular weather type or the occurrence of a weather type of at least a predetermined severity The processing resource may be configured to exclude or downgrade route segments having a selected classified road type in a route calculation process, in response to the occurrence of a particular weather type of the occurrence of a weather type of at least a predetermined severity or in response to an input from a user of the navigation apparatus. The selected classified road type may represent minor roads.

The navigation apparatus may comprise a portable device, for example a portable navigation device (PND), mobile telephone or portable computer. Alternatively or additionally, the navigation apparatus may comprise a server. Functionality of the apparatus may be split between a server and a portable device.

The apparatus, which may comprise a mobile device, may comprise an output device, for example a display and/or speaker, and the processing resource may be configured to provide the alert signal to the output device to provide an alert to a user.

The apparatus, e.g. mobile device, may be configured to transmit data representative of the location of the mobile device and/or the route to the selected location to a server, and the server may be configured to select weather-related data in dependence on the location of the mobile device and/or the route and to transmit the selected weather-related data to the mobile device.

In a further aspect of the invention there is provided a server system for providing weather-related data to at least one navigation apparatus, the server system comprising a processing resource configured to obtain weather data, to process the weather data to produce speed modification data and to transmit the speed modification data to the at least one navigation apparatus, wherein the speed modification data comprises a plurality of sets of speed modification data, each set of speed modification data being associated with a respective, different road classification type.

The weather data may comprise data representative of the level of a particular weather type at a location, and the server may be configured to apply a model, for example an exponential model, to determine the speed modification factor data for that location from the weather data.

The server may be configured to determine the speed modification data at a location using an exponential model, for example the model:

$$\eta(I) \propto \exp(-\alpha I),$$

where $\eta$ is a speed modification factor, I is representative of the level of a particular weather type at the location and $\alpha$ is an attenuation factor.

The processing resource may be configured to correlate weather data and travel data for each of a plurality of road segments thereby to determine weather reaction data representing speed modification for each of the plurality of road segments as a function of at least one weather condition.

The processing resource may be configured to determine the speed modification data based upon the weather reaction data representing speed modification as a function of at least one weather condition, and current or forecast weather for the at least one road segment.

In another aspect of the invention there is provided an apparatus for determining a variation of speed of travel with weather conditions, comprising a processing resource configured to obtain weather data and travel data for each of a plurality of road classification types, weather data and travel data for each of a plurality of road segments of the same road classification type, and to correlate the weather data and the travel data for that road classification type thereby to determine weather reaction data representing speed modification for each of the plurality of road segments as a function of at least one weather condition.

The processing resource may be configured to classify each segment to one of a plurality of classifications and to determine weather reaction data for each classification, each classification representative of a respective level of sensitivity to at least one weather condition and/or of a at least one road property, and optionally the correlating comprises correlating weather data and travel data for road segments of the same classification.

In a further aspect of the invention there is provided a navigation system comprising at least one navigation apparatus as claimed or described herein and a server system for providing the weather-related data to the at least one navigation apparatus.

The server system may be configured to select weather-related data in dependence on a location of the navigation apparatus and/or the determined route to the selected destination, and to transmit the selected weather-related data to the navigation apparatus.

The server system may be configured to select weather-related data for locations within a threshold distance of the location and/or the route.

In another aspect of the invention there is provided a method of performing a navigation operation, comprising receiving weather-related data, modifying speed data for each of a plurality of route segments in dependence on the weather-related data and in dependence on a respective road classification type and performing a navigation operation using the modified speed data.

The navigation operation may comprise at least one of determining a route to a destination and determining an estimated time of arrival (ETA).

The speed data for a route segment may be representative of the expected speed of travel along the route segment, and the method may comprise modifying the expected speed of travel in dependence on the weather-related data.

The weather-related data may comprise weather-related data for a plurality of different times, and the processing resource may be configured to determine, for at least one segment of the route, an expected time of arrival for that segment and to use the weather-related data for that expected time of arrival to modify the speed data for that segment.

The method may comprise, for each route segment providing a respective classifier that classifies the road type for the route segment, and the method may comprise, for each segment, modifying the speed for that segment based on the weather-related data and the road type represented by the classifier.

The weather-related data may comprise a plurality of sub-sets of weather-related data, each sub-set of weather-related data being specific to a respective one of the road types, and the method may comprise selecting, for each route segment, a sub-set of weather-related data based on the road type represented by the classifier for that route segment.

The weather-related data may comprise data representative of expected weather conditions as a function of location, wherein the weather conditions comprise, for example, one or more of presence or amount of precipitation, for example rain, hail sleet or snow; wind speed and direction; presence or amount of lying snow; presence or amount of ice; level of visibility; presence or amount of fog; temperature.

The weather-related data may comprise speed modification data, for example speed modification factor data, representative of the expected modification of speed due to weather conditions.

The weather-related data may comprise at least one set of contour data, each set of contour data representative of a respective area of equal weather conditions or speed modification factor, and the method may comprise determining the weather-related data for a route segment from the position of the route segment and the contour data for that position.

The weather-related data may comprise a parametric representation of the weather-related data, for example a transform or fit of the weather-related data, and the method may comprise extracting the weather-related data from the parametric representation.

The method may comprise determining an estimated time of arrival at the destination and modifying the estimated time of arrival based on the modified speed data.

The method may comprise calculating a route to the selected destination in dependence on expected speed of travel, and recalculating the route in response to the modification of the speed data.

The method may comprise repeatedly receiving updated weather-related data and repeatedly modifying the estimated time of arrival or repeatedly recalculating the route.

The method may comprise transmitting data representative of the location of a mobile device and/or the route to the selected location to a server. The method may comprise selecting weather-related data in dependence on the location of a mobile device and/or the route and transmitting the selected weather-related data to the mobile device.

In a further independent aspect of the invention there is provided a method comprising processing weather data to produce weather-related data and transmitting the weather-related data to at least one navigation apparatus, wherein the weather-related data comprises speed modification data, for example speed modification factor data, and the processing of the weather data comprises determining the speed modification factor data from the weather data.

The weather data may comprises data representative of the level of a particular weather type at a location, and the method may comprise applying a model, for example an exponential model, to determine the speed modification factor data for that location from the weather data. The model may comprise the formula:

$$\eta(I) \propto \exp(-\alpha I),$$

where $\eta$ is a speed modification factor, I is representative of the level of a particular weather type at the location and $\alpha$ is an attenuation factor.

The method may comprise determining parameters of the or model linking weather data to speed modification factors from historical weather data and historical travel data. The method may comprise, for each of a plurality of route segments and/or for each of a plurality of route segment classifications, correlating historical weather data and historical travel data.

The method may comprise selecting weather-related data in dependence on a location of the or a navigation apparatus and/or the determined route to the selected destination, and to transmit the selected weather-related data to the navigation apparatus. The method may comprise selecting weather-related data for locations within a threshold distance of the location and/or the route.

In another independent aspect of the invention there is provided a computer program product comprising computer readable instructions that are executable to perform a method as claimed or described herein.

There may also be provided an apparatus or method substantially as described herein with reference to the accompanying drawings.

Any feature or aspect of the invention may be combined with any other feature or aspect of the invention, in any appropriate combination. Apparatus features may be applied as method features and vice versa.

DETAILED DESCRIPTION OF EMBODIMENTS

Embodiments of the invention are now described, by way of non-limiting example, and are illustrated in the following figures, in which.

Figure 1:
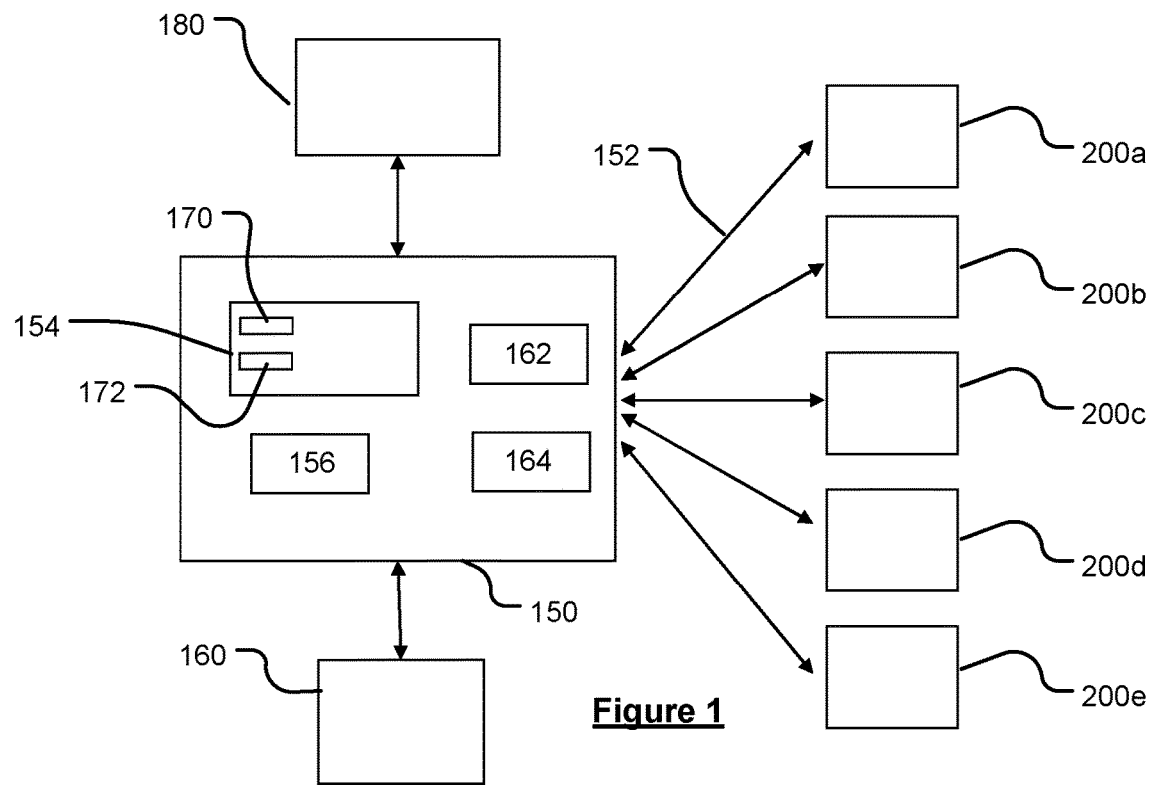
FIG. 1 is a schematic illustration of a navigation system according to a first embodiment.

A system according to an embodiment is illustrated schematically in FIG. 1. The system comprises a server 150 that is operable to communicate with a plurality of portable devices, for example PNDs 200a to 200e. Only five devices 200a to 200e are shown for clarity, but it will be understood that in practice many thousands, or more, devices may be in communication with the server 150.

In the embodiment of FIG. 1 the devices 200a to 200e are vehicle-mounted PNDs, that use Global Positioning System (GPS) technology to determine their positions, and that are able to perform navigation or mapping operations. Examples of such devices include, but are not limited to, the GO LIVE 1005 model manufactured and supplied by TomTom International B.V. The devices 200a to 200e are not limited to being PNDs and may be any suitable type of device with navigation functionality, for example a mobile phone or portable computer.

The server 150 includes a processor 154 operatively connected to a memory 156. In operation, software stored in server memory 156 is read by the processor 154 to load software modules or other software components that enable the processor 154, to perform various processing or communication functions. In the embodiment of FIG. 1, the software modules comprise a weather impact modelling module 170 and a weather data processing module 172. The operation of the different modules will be described in more detail below.

The server 150 is further operatively connected to a mass data storage device 160. The mass storage device 160 contains a store of navigation data, and can again be a separate device from the server 150 or can be incorporated into the server 150. The mass data storage device 160 can be used to store probe data from the devices 200a to 200e.

The server 150 is also in operative communication with at least one source of weather data 180, for example a third party website or weather communication centre that provides a dedicated weather feed. The at least one source of weather data can, alternatively or additionally, comprise weather sensor(s), rain radar(s) or a computer performing model calculations. The server 150 communicates with the at least one source of weather data via any suitable communications channel, for example via Internet connection or via a dedicated wired or wireless connection.

The server 150 is able to collect and fuse localized, accurate weather information (including but not limited to current/forecast information on precipitation, temperature, wind condition, and regional severe-weather warnings like storm or road ice, etc.) from multiple sources if desired.

The processor 154 is operable to transmit and receive information to and from devices 200a to 200e via communications channel 152, for example via transmitter 162 and receiver 164. The signals sent and received may include data and/or other propagated signals. The transmitter 162 and receiver 164 may be selected or designed according to the communications requirement and communication technology used in the communication design for the navigation system. Further, it should be noted that the functions of the transmitter 162 and receiver 164 may be combined into a single transceiver.

In the normal course of operation of the navigation devices 200a to 200e, GPS data from the devices are regularly recorded (for example, each 5 seconds for some systems) as probe data on a logging device, usually in the form of a data logger module included on the portable navigation devices themselves.

As well as receiving and processing probe data received from the devices 200a to 200e, the server 150 can also provide data to the devices 200a to 200e, for example in the form of digital map data (for example, digital map data updated in view of received probe data), software upgrades, or traffic updates. It is a feature of the embodiment of FIG. 1 that the server 150 also provides weather-related data to the devices 200a to 200e, as will be described in more detail below. The weather-related data can be used by the devices to for example, modify an estimated time of arrival for a route in dependence on weather conditions or modify a route based on expected variations of speed due to weather conditions.

Although the communication channel 152 of the embodiment of FIG. 1 may comprise an internet connection, any suitable form of data channel can be used. The communication channel 152 is not limited to a particular communication technology. Additionally, the communication channel 152 is not limited to a single communication technology; that is, the channel 152 may include several communication links that use a variety of technology. For example, the communication channel 152 can be adapted to provide a path for electrical, optical, and/or electromagnetic communications. As such, the communication channel 152 includes, but is not limited to, one or a combination of the following: electric circuits, electrical conductors such as wires and coaxial cables, fibre optic cables, converters, radio-frequency (RF) waves, the atmosphere, or free space. Furthermore, the communication channel 152 can include intermediate devices such as routers, repeaters, buffers, transmitters, and receivers, for example.

In one illustrative arrangement, the communication channel 152 includes telephone and computer networks. Furthermore, the communication channel 152 may be capable of accommodating wireless communication, for example, infrared communications, radio frequency communications, such as microwave frequency communications. Alternatively or additionally, the communication channel 152 can accommodate satellite communication.

The communication signals transmitted through the communication channel 152 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), or Global System for Mobile Communications (GSM). Both digital and analogue signals can be transmitted through the communication channel 152. These signals may be modulated, encrypted and/or compressed.

Figure 2:
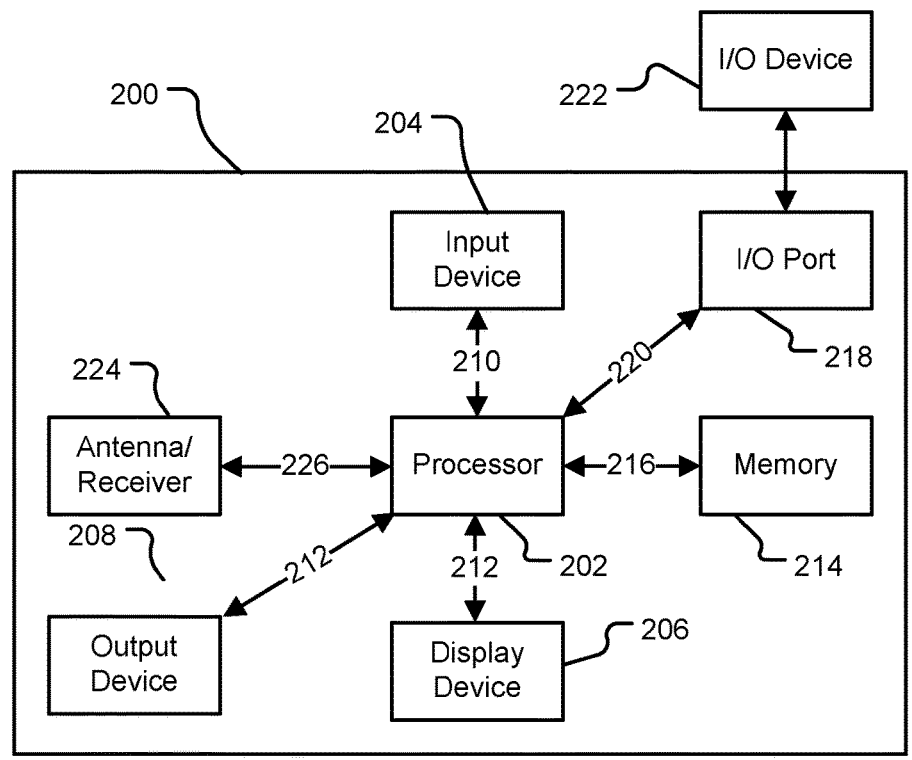
FIG. 2 is a schematic illustration of a navigation device according to an embodiment.

A navigation device 200 in one embodiment is illustrated in FIG. 2. The navigation device 200 is representative of any one of the devices 200a to 200e shown in FIG. 1. It should be noted that the block diagram of the navigation device 200 is not inclusive of all components of the navigation device, but is only representative of many example components. The navigation device 200 is located within a housing (not shown). The navigation device 200 includes a processing resource comprising a processor 202, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

In one arrangement, the touch panel, and the display screen 206 are integrated so as to provide an integrated input and display device, including a touchpad or touchscreen input to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touchscreen.

In the navigation device 200, the processor 202 is operatively connected to and capable of receiving input information from input device 204 via a connection 210, and operatively connected to at least one of the display screen 206 and the output device 208, via respective output connections 212, to output information thereto. The navigation device 200a may include an output device 208, for example an audible output device (e.g. a loudspeaker). As the output device 208 can produce audible information for a user of the navigation device 200, it is should equally be understood that input device 204 can include a microphone and software for receiving input voice commands as well. Further, the navigation device 200a can also include any additional input device 204 and/or any additional output device, such as audio input/output devices for example.

The processor 202 is operatively connected to memory 214 via connection 216 and is further adapted to receive/send information from/to input/output (I/O) ports 218 via connection 220, wherein the I/O port 218 is connectible to an I/O device 222 external to the navigation device 200. The external I/O device 222 may include, but is not limited to, an external listening device, such as an earpiece for example. The connection to I/O device 222 can further be a wired or wireless connection to any other external device such as a car stereo unit for hands-free operation and/or for voice activated operation for example, for connection to an earpiece or headphones, and/or for connection to a mobile telephone for example, wherein the mobile telephone connection can be used to establish a data connection between the navigation device 200 and the Internet or any other network for example, and/or to establish a connection to a server via the Internet or some other network for example.

Figure 3:
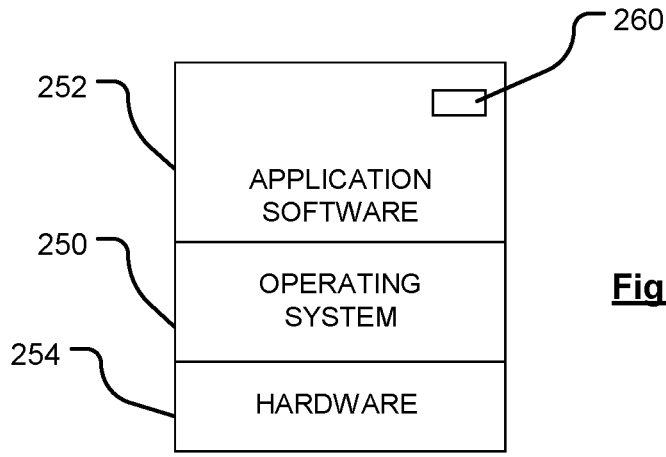
FIG. 3 is a schematic illustration of a processing resource of FIG. 2.

Referring now to FIG. 3 of the accompanying drawings, internal flash memory (not shown) of the device 200 stores a boot loader program that is executable by the processor 202 in order to load an operating system 250 and application software 252 from the storage device 214 (shown in FIG. 2) for execution by functional hardware components 254, which provides an environment in which the application software 252 can run. The operating system 250 serves to control the functional hardware components and resides between the application software 252 and the functional hardware components 254.

The application software 252 provides an operational environment including a GUI that supports core functions of the navigation device 200, for example map viewing, route planning, navigation functions and any other functions associated therewith. The application software 252 is able to plan routes and determine the expected time of arrival at a destination based on expected speed of travel for each segment of a route, using known techniques. The expected speed of travel for each segment of road or other thoroughfares of a digital map can be stored as speed data in the device 200 and accessed when required. The speed data can be updated via speed data updates from the server 150.

When a user switches on the navigation device 200, the device 200 acquires a GPS fix and calculates (in a known manner) the current location of the navigation device 200. The user is then presented with a display showing in pseudo three-dimensions the local environment in which the navigation device 200 is determined to be located, and in a region of the display below the local environment a series of control and status messages.

By touching the display of the local environment, the navigation device 200 switches to display a series of virtual or soft buttons represented by icons by means of which a user can input a destination to which they wish to navigate, and perform various other functions relating to control of the navigation device 200 or display of data on the display.

It is a feature of the embodiment of FIG. 1, that the functions of the navigation device 200 can be performed in dependence on weather-related data, for example received from the server 150. The application software 252 includes a data processing module 260 that is operable to perform or modify route calculation functions in dependence on received weather-related data, as described in more detail below.

Before describing the processing of the weather-related data at the devices 200, the processing of weather data by the server 150 to determine weather-dependent variations in traffic and the transmission of speed or weather data to the devices 200 is described.

Figure 4A:
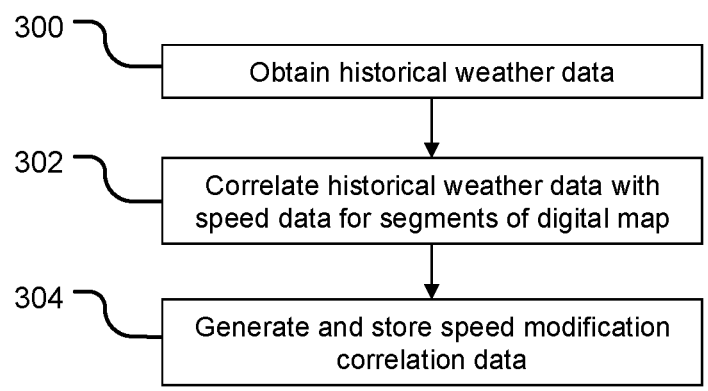
FIGS. 4a and 4b are flowcharts illustrating in overview the processing of weather data at a server of the system of FIG. 1.

FIG. 4 is a flowchart illustrating in overview the processing of weather data at the server 150.

At the first stage 300 the server 150 obtains historical weather data representative of weather conditions for a region represented by digital map over a significant period of time, for example one year. The server 150 also has access to large quantities of probe data stored in the data store 160 and representing the movement of vehicles over roads or other thoroughfares represented by the digital map. The probe data can be processed to obtain, for example, one or more of the following: average vehicle speeds along individual road segments per time bin; traffic density on individual road segments per time bin (obtained for example from extrapolated and normalised density of navigation devices or from ultrasound distance detectors located at the front and back of vehicles); statistical spread of speeds for each road segment and time bin; and jam probabilities for individual road segments and time bins.

The weather data can represent one or more different weather types, for example one or more of: presence or amount of precipitation such as rainfall, hail or snow; windspeed; wind direction; presence or amount of ice or lying snow; presence or amount of surface water; presence or amount of fog; visibility level; and temperature. The weather data obtained from any suitable source, for example official weather records maintained by government or commercial agencies. Weather data from multiple sources may be used. Weather-related data obtained from suitably equipped individual vehicles can also be used in some embodiments. Such weather-related data obtained from individual vehicles can include for example data representative of slip events, operation of fog lamps, operation of windscreen wipers, temperature measurements, or rain detection.

The server 150 has access to a sufficiently large archive of weather data and probe data to allow statistically significant measurement of weather dependent speed averages and their significance. The modelling module 170 at the server 150 is configured to apply, at stage 302, correlation techniques to correlate variation in average speed for different segments of roads or other thoroughfares of the digital map with the variation in the or each weather condition. The modelling module 170 can also derive statistical correlations between weather conditions and, for example, jam probabilities, drivers' route preferences or any other traffic-related parameter as desired. The server 150 provides offline statistical analysis for calculating speed profiles and weather influence.

It has been found that a classification of different road types based on their sensitivity to weather conditions is useful in performing the correlation procedure. For example, precipitation intensity alone is often not sufficient as a parameter within some algebraic expression giving the average speed modification for all roads. The influence of precipitation can be non-linear and discontinuous in some cases, depending on the local traffic scenario and road layout.

In one mode of operation each road segment is classified to one of a plurality of road type classifiers (for example, 5, 10 or more different road type classifiers may be used). Each classifier may represent roads having one or more characteristics, for example: width, number of carriageways, surface type (e.g. unpaved or potholed roads), average speed or traffic volume under normal conditions and/or rush-hour conditions, urban or rural location, proximity to traffic junction or traffic lights. Functional road classifications (FRCs) such as those used by TomTom International B.V. in their products may be used as the road classifiers. Each road segment may be assigned a classifier based on a priori assessment of properties of the road segment or, alternatively, each road segment may be assigned a classifier based on a posteriori determination of how speed properties of the segment vary with weather conditions. In that second case, each classifier may represent a respective level of sensitivity to at least one weather condition.

The number and types of classifications that are used can depend on the number of distinct reactions to weather conditions from different segments and the importance to traffic, and also on the limits of band-width for transmission of data to the devices 200a-200e via channel 152, as in general the larger the number of classifications the larger the amount of data that needs to be transmitted to the devices. In one mode of operation, classification data representative of the classification of each road segment is stored as digital map data at the devices 200a to 200e.

For each classification, the reaction to different types and levels of weather conditions can be determined by correlating speed data for each segment of that classification with corresponding weather data representative of weather conditions at the road segment. Usually, the reaction represents modification of speed with respect to a weather-unimpaired speed profile. Congestion estimations can usually be inferred via the time-dependent speed profile as a deviation of free-flow speed. The correlation process can be a time-dependent process, which correlates weather data and speed data obtained for the same time of day or week, thus taking into account expected daily or weekly variations in average speed for particular segments.

The correlation process can be used to determine average speeds as a function of precipitation and/or road condition, average speeds specific for FRC or other classifications under the weather condition, jam probabilities under the weather condition, and/or a classification of weather types with respect to average speed.

The correlation process can also take into account variation of weather conditions over time and associated changes in speed or other travel conditions. For example, the correlation process can determine how quickly lying snow or ice has been found to melt or be removed for a given road segment or segments, or a given road classification type, for given variations in temperature or other weather condition over time. For example, it may be found that for some roads, lying snow and ice may be expected to disappear more rapidly than for other roads, given a certain rise in temperature. Given the large amount of historical data for many road segments, such multi-parameter correlations can be determined relatively accurately.

In the embodiment of FIG. 1, the correlation process results in the generation of weather reaction data for each road segment classification type representing the expected modification of average speed in response to weather conditions of one or more types and levels of severity.

It has been found that the variation of speed with severity of weather for each road segment classification type can be modelled effectively using a quantitative model, for example an exponential model in which the speed modification varies exponentially with the severity of a particular weather condition. The weather reaction data can be fitted to the selected model using known fitting techniques Stages 302 to 304 are computationally costly and, in some modes of operation, are repeated only every 3 to 6 months or whenever a traffic engineer or other operator considers that changes that affect the results may have occurred.

Figure 4B:
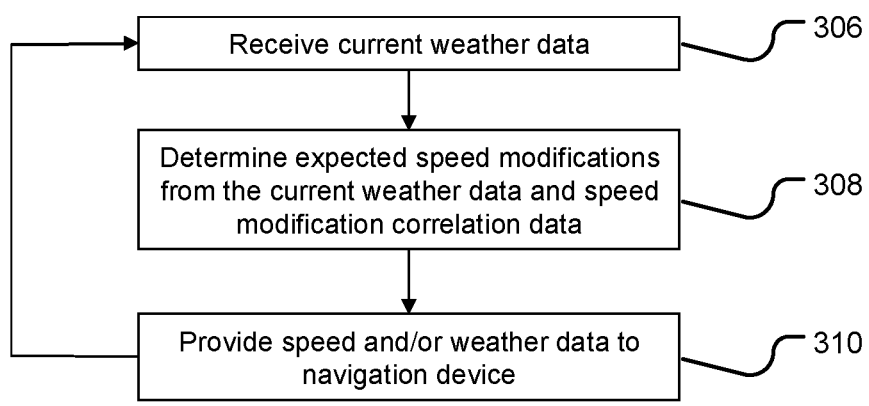

It is a feature of the embodiment of FIG. 1 that speed modification factors for each road classification type and each location in a region can be calculated on-the-fly based on received weather data, as will now be described in more detail with reference to FIG. 4b.

In operation the server 150 receives current weather data at stage 306 from the weather data source 400 on a regular basis, for example every 15 minutes. The current weather data usually comprises a set of weather data comprising the most recent measured weather data and sets of forecast weather data representing forecast weather conditions for times in the future, for example at 15 minute intervals for three hours in the future.

Each set of weather data may comprise a plurality of data points, each data point representing a weather condition (for example rainfall level) at a respective location in a region. In some case, the data points may correspond to regularly spaced positions across the region. In some embodiments, the weather data is in the form of text data or XML data, although any suitable data format can be used. In some cases, the set of weather data comprises or is used to generate a frame of weather data that can be used to display an image representing the weather condition for the region at a particular time.

In some modes of operation the server 150 may receive a plurality of sets of weather data each representing a different weather condition (for example rainfall, temperature, wind speed) at one particular time.

The weather data processing module 172 processes each received set of weather data for a selected weather type at stage 308 based upon the previously determined weather reaction data to determine a respective speed modification factor due to the actual or forecast weather condition at a particular time for each location in the region and for each road classification type. The speed modification factor for a particular road classification type and that location represents the expected modification of expected average speed of travel along a road of that road classification type at that location due to the weather condition.

Further sets of speed modification factor data may be produced for each weather type that is under consideration. In some modes of operation only a single weather type is considered, for example rainfall. If multiple weather types are considered, then the speed modification factor data for the different weather types may be combined, for example by taking the highest calculated speed modification factor for each location.

In the mode of operation that has been described, the reaction of a road segment, or a road segment type, due to weather conditions is determined based upon correlation of historical probe data and historical weather data. Expected speed modification can then be determined for route segments for the current time and for future times, based upon the current or forecast weather and the historically-determined reaction of the road segments to weather conditions.

In some cases, the historical correlation takes into account short-term variations of weather conditions over time and associated changes in speed or other travel conditions.

For example, historical correlations can be used to determine the expected time for speeds for particular segments or road types to recover to normal following the end of a particular weather condition, for example following rainfall or snowfall. Such time-dependent historical correlations can be used to determine expected speed modification.

For instance, weather conditions may now be good or be expected to be good for a particular segment but if there has been rainfall or snowfall within a certain preceding period of time, it may be determined based on historical data that there is expected to be a speed modification, usually a speed reduction.

Such calculations can take into account a large number of different parameters. For example, the time taken for speeds to recover to normal following rainfall, snowfall, ice formation or other weather condition may depend on how long the weather condition lasted, the severity of the weather condition, and other weather conditions in the intervening period since the weather condition ended. For example, the time taken for speeds to recover to normal following snowfall may depend on the severity and length of the snowfall and on temperatures in the intervening period since the end of the snowfall. Such calculations can also depend on road classification type. For example, major roads may be found to recover more rapidly from snowfall or other conditions, which may be due to a variety of factors, for example the condition of the road surface, the amount of use of the road, and the increased likelihood that the road will be cleared by a snow plough or other road clearance equipment.

At the next stage 310, speed modification data is provided to one or more of the navigation devices 200a to 200e.

In one mode of operation, the navigation device 200 transmits to the server 150 its location and route data representative of a selected route. The server 150 selects speed modification factor data for the immediate surroundings of the navigation device 200 and speed modification factor data for locations along the selected route and within a certain margin around it. The margin can be directionally dependent and can be adapted intelligently based on factors like the current wind speed and direction and on the actual or expected travelling speed of the device 200. The transmitted data comprises speed modification factor data to the current time as well as forecast speed modification factor data for a feasible period into the future. In combination, this enables the device 200 to take into account the relevant weather conditions along the individual segments of the route at the actual times when the vehicle in which the device 200 is installed will pass them, as will be described in more detail below.

In some variants of the embodiment, the server 150 selects speed modification factor data for transmission to the device 200 based on both the location of the device 200 and the route, and also on the expected time at which the device 200 will arrive at different segments of the route. Thus, for example, speed modification factor data for the current time for locations within a margin around the current location of the device 200 would be transmitted, but speed modification factor data for a time in the future for those locations may not be transmitted as the device 200 would be expected to be at a location further down the route by that future time.

By selecting only some of the speed modification factor data for transmission based on the location of the device 200 and/or the route the amount of data that needs to be transmitted can be reduced.

A further significant feature of the embodiment of FIG. 1 is that the speed modification factor data may be processed further before transmission by the weather data processing module 172 in order to reduce the amount of data to be transmitted. The processing of the data in one mode of operation comprises representing the speed modification factor data by contour data and transmitting the contour data rather than the raw speed modification factor data to the device 200. In another mode of operation, the processing of the data comprises transforming the data, e.g. using a Fast Fourier Transform (FFT) procedure, to represent the data as a plurality of coefficients. The coefficients are then filtered, and only those coefficients that are required to recreate an suitably accurate representation of the original data are transmitted to the device 200. Such techniques for reducing the amount of data that needs to be transmitted are discussed in more detail below.

Figure 5:
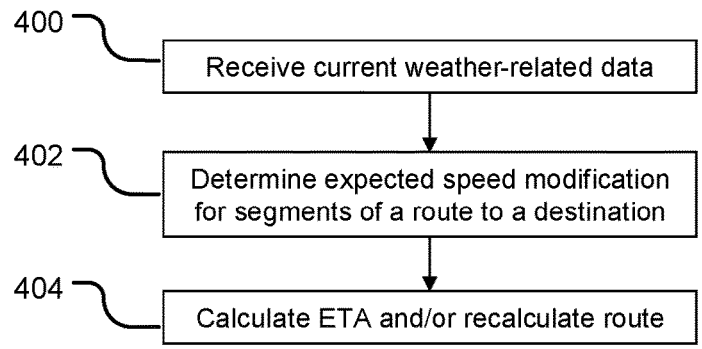
FIG. 5 is a flowchart showing in overview processes to determine or modify an ETA or a route to a destination.

FIG. 5 is a flowchart showing in overview processes performed by the device 200 to determine an ETA and/or to determine or modify a route to a destination based on received weather-related data.

At the first stage 400 the process, the device 200 receives current weather-related data. The current weather-related data in this case comprises a plurality of speed modification factor data sets. Each speed modification factor data set comprises a set of speed modification factor data, each set of data points corresponding to a particular time and to a particular road type classification. A separate speed modification factor data set is transmitted for each time (for example, the current time and for a plurality of times in the future, e.g. for three hours into the future at 15 minute increments) and for each road type classification.

The transmitted speed modification factor data represents expected speed modifications due to current weather conditions as well as due to the forecast weather for a feasible period into the future. This information enables the device to take into account relevant weather conditions along individual segments of the route at the actual times when the vehicle will pass them.

In practice, the speed modification factor data sets may not vary significantly between each predetermined interval, and in that case the processor 150 may transmit only updates to the previously transmitted data sets. For example, the processor 150 may only transmit new data sets for a particular time if the speed modification factor data for that time has altered by greater than a predetermined threshold since the previous transmission.

Furthermore, in the example described in relation to FIG. 5, speed modification factor data sets are only transmitted to the device 200 for regions within a predetermined margin of the route to a selected destination that has been calculated by the device 200. The device 200 has previously transmitted destination data, or route data representative of the route, to the server 150. It can be understood that by transmitting data for locations only within a predetermined margin distance of a calculated route, and by transmitting updated data only when required, the rate of data transmission to the device 200 can be kept within the available bandwidth.

The device 200 has already calculated a route to a selected destination using known techniques. The route comprises a plurality of connected segments and for each of those cases segments the device 200 determines an expected ETA at the segment, based on expected speeds of travel for each preceding segment of the route. The calculation of ETAs can be performed using speed data stored at the memory 214 of the device 200 using known techniques, such as the time dependent average speeds used in TomTom IQ Routes (RTM).

The memory 214 of the device 200 also stores road type classification data, classifying each of the segments represented in the digital map to one of the classifications used by the server 150 to determine reaction to weather conditions.

The device 200, for each of the segments, reads classification data from the memory 214 to determine the road classification for that segment and then determines the received speed modification factor data set that is relevant for that segment based on the calculated ETA at the segment. In one mode of operation, the device 200 determines the speed modification factor data set that is representative of a time closest to the ETA at the segment, and uses that speed modification factor data set for that segment.

In another mode of operation, the device 200 determines the speed modification factor data sets that immediately precede and immediately follow the ETA at the segment. The processing module 260 may then perform a suitable interpolation procedure, such as linear interpolation, to determine the applicable speed modification factor for the segment in question.

The device 200 then determines a modified speed of travel for the segment by multiplying the stored expected speed of travel for that segment by the speed modification factor for that segment determined from the received weather-related data and representing the expected modification of speed of travel due to adverse weather conditions (step 402).

The device 200 then recalculates the ETA at the next segment of the route based on the modified expected speed of travel determined for the preceding segment or segments, and determines the expected speed modification for that next segment. The process is repeated for each segment of the route in succession.

At step 404, once the process has been repeated for each segment of the route, the processing module 260 determines an ETA at the final destination. The ETA may then be displayed to the user. In some modes of operation, a message, or icon or other feature is also output to the user indicating that the ETA has been modified due to adverse weather conditions. The map display may indicate the intersection of the current route with the bad weather zone (which may, for example, be coloured red or any other suitable colour) plus the new route (which may be coloured differently to the existing route, for example coloured green).

In some modes of operation, the device 200 also determines whether to recalculate the optimum route to the destination, in view of expected speed modifications due to adverse weather conditions.

In normal operation the device 200a calculates many possible routes to a destination (depending on the destination and the number of routes available) and selects the fastest route (that route providing the earliest expected ETA). In one mode of operation, the device 200 determines other possible routes to the destination periodically, as the vehicle travels along the selected route, and determines the expected ETA and time of travel to the destination for each of those routes under normal conditions.

If the modified ETA for the selected route is determined to be later than the ETAs under normal conditions for the other routes by a predetermined margin (for example, the ETA is more than 5 minutes or 10 minutes later, or the expected time of travel is more than 5% or 10% later), then the processing module 260 performs the expected speed modification procedure for one or more of the other possible routes to determine the expected ETA for those other routes. If the weather-modified expected ETA for one of the other routes is earlier than for the selected route then the selected route may be replaced by that other route that has an expected ETA (dependent on any route restrictions specified by the user) or a message may be displayed to the user giving them the option to switch to that other route.

In another mode of operation, the weather-modified expected speed of travel and ETA is performed for each of the possible routes each time new weather-related data is received.

In the described embodiment, the speed modification data comprises speed modification factor data that can be multiplied by the expected speed of travel under normal conditions to obtain expected speed of travel under the associated weather condition. However the speed modification data can be in any suitable form in alternative embodiments. For example, the speed modification data may represent an expected absolute modification of speed, or an expected absolute speed, under the associated weather condition.

As will be appreciated, the process of FIG. 5 has been described in relation to the receipt and processing of speed modification factor data. It is also contemplated, however, in other embodiments of the invention that the weather-related data transmitted from the server 150 is data that represents actual and/or expected weather conditions. In this mode of operation the speed modification factors are calculated at the device 200 from the weather data by the processing module 260. The process for calculating the speed modification factors from the weather data corresponds to that process when performed by the server. It can be understood that in the described embodiments, effective modification of ETA and/or route selection based upon expected weather conditions can be achieved whilst also maintaining the rate of data transmission to the device 200 within available bandwidth.

Figure 6:
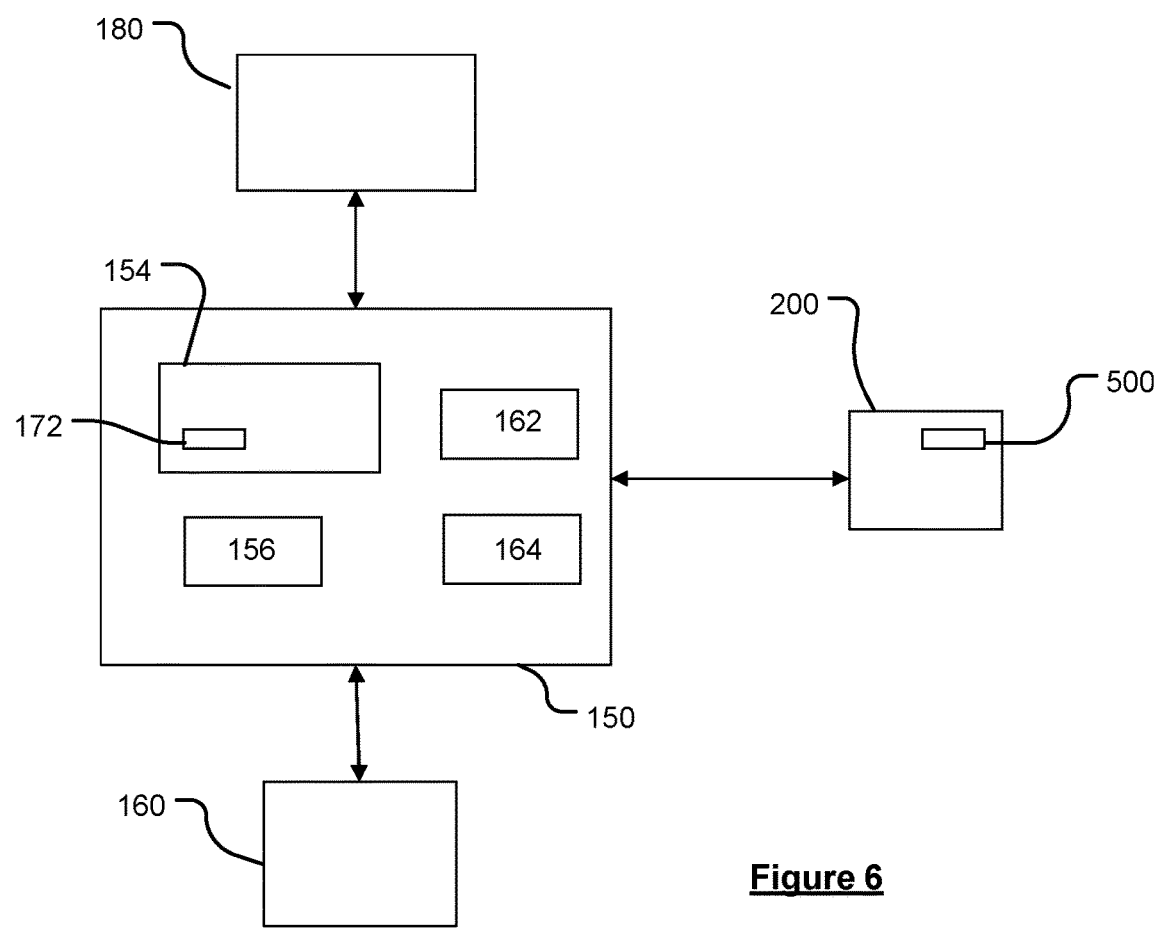
FIG. 6 is a schematic illustration of a navigation system according to a second embodiment.

A system in accordance with this embodiment is shown in FIG. 6. The system essentially corresponds to that shown in FIG. 1, except that weather impact modelling module 170 is no longer present on the server 500, but is now a module 500 within the navigation device 200.

The module 500 may be in operative communication with a data store that stores a plurality of predetermined speed modification factors, each speed modification factor being associated with a particular type or level of weather condition and a particular road type classifier. The stored speed modification factors can be updated as needed, e.g. on a 3 to 6 month basis. In such embodiments, weather data that has been processed by the processing module 172 is transmitted to the device 200, e.g. in accordance with any of the ways herein described used to transmit the speed modification factor data sets to the device 200. For example, the weather data may be transmitted to the device 200 as contour data or as a set of filtered coefficients (as will be discussed in more detail below). In use, the appropriate speed modification factor is selected for a segment based on the received weather data and the road classification of the segment, and the modified speed for the segment used in navigation operations, such as calculating a route to a destination and/or determining an ETA at a destination.

In embodiments of the invention, the weather-related data, e.g. speed modification factor data sets or actual or predicted weather conditions, is processed before being transmitted to the navigation device by the weather data processing module 172 in order to reduce the amount of data that needs to be transmitted.

In one mode of operation, the processing of the data comprises representing the weather-related data by contour data and transmitting the contour data to the device 200. The process will be described with reference to the transmission of speed modification factor data, but it will be appreciated that the process is equally applicable to the transmission of weather data.

The module 172 processes a set of speed modification factor data for a particular time and a particular road type classification to determine contours that represent the boundaries of areas which the speed modification factor has the same value. The contours may be nested contours, with one contour falling within another contour and delimiting the transition from an area having a speed modification factor of one value to an area having a speed modification factor of another value.

The processing module 172 then fits each contour to a shape and stores the data representative of the fit as contour data. The fitting can be performed using any suitable known fitting techniques, for example least-squares fitting. Any suitable shape can be used, but it has been found particularly efficient to fit each contour to a polygon shape. Alternatively, ellipse or rounded triangle shapes can be used, for example. The number of vertices of each polygon can be fixed in advance or can be selected during processing to ensure that a goodness of fit within a predetermined threshold is obtained.

The contour data comprises the coordinates of each of the vertices of the fitted polygon, together with a contour value representing the value of the speed modification factor represented by the contour.

Although the fitting of contours to the data has been described in relation to speed modification factor data, in other embodiments or variants, the contour fitting is performed on each set of weather data rather than on the speed modification factor data. The resulting weather contour data can then be processed, e.g. on the device 200, to determine speed modification factor contours using the speed modification model. When weather data is being processed, contours are determined that represent the boundaries of areas which have the same type and/or intensity of weather.

As well as generating contour data to represent data, for example weather-related data such as speed modification factor data or weather data, the processing module 172, in embodiments of the invention, also tracks contours over time. The processing module 172 performs the contour identification and fitting procedure for a plurality of data sets, each data set representative of a different time, and then performs a further procedure to track contours between the different data sets. The tracking procedure comprises comparing the shape, size and position of contours between different data sets to determine which contours in the different data sets correspond to each other and for example represent the same area of weather at different times. Any suitable data comparison, correlation or fitting procedure can be used to determine which contours correspond to each other.

Figure 7:
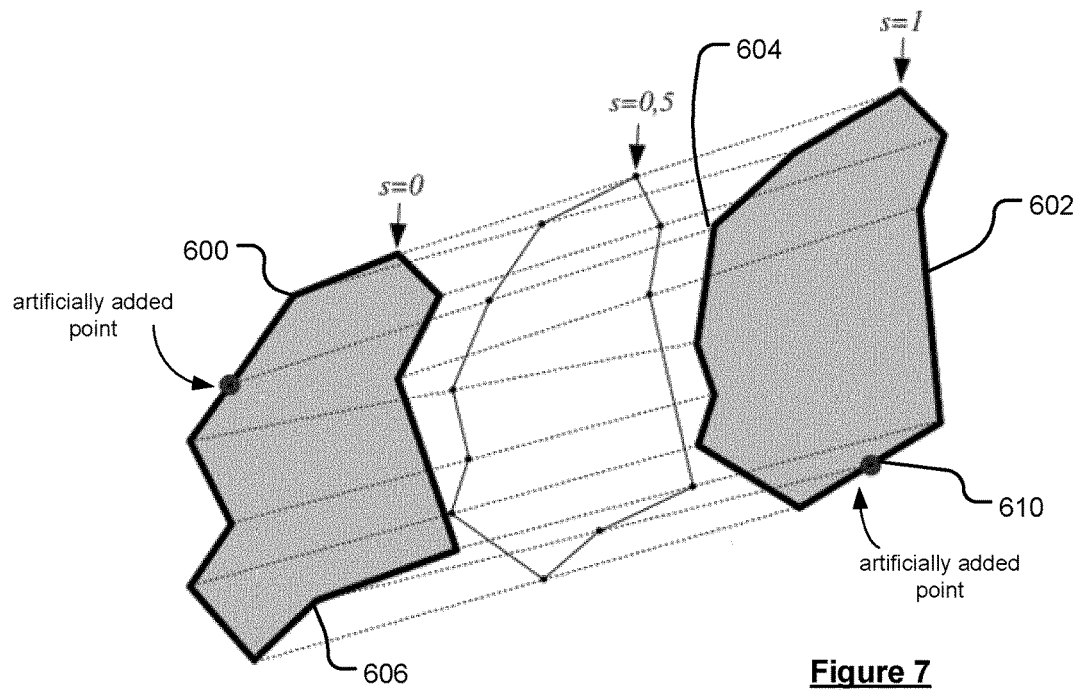
FIG. 7 is a plot showing two contours representing the same area of precipitation at different times.

By way of illustration, two contours 600 and 602 representing the same area of precipitation at different times, and obtained from different weather data sets, are shown in FIG. 7. The positions of the contours 600, 602 represent the relative positions of the areas of precipitation. The first contour 600 represented by an identifier value s=0 is representative of an area of precipitation at a time A. The second contour 602 represented by an identifier value s=1 is representative of the area of precipitation at a later time B.

The contour data representing the contours 600, 602 can be interpolated to obtain the shape and position of the contour at an intermediate time C=A+(B−A)/2 by interpolating the positions of corresponding vertices of the contours as illustrated schematically in FIG. 7. A linear interpolation of the vertices is indicated in FIG. 7 by dotted lines.

It can be seen in FIG. 7 that the shape of the contour has changed between time A and time B, with an additional vertex 604 towards the top left of the contour having appeared at time B, and a vertex 606 towards the bottom of the contour having disappeared between time A and time B.

In order to enable easier subsequent interpolation between the contour data sets 600, 602 the processing module 172 artificially adds contour data points representative of the appearing and disappearing vertices to the contour data sets.

The processing module 172 can also include vertex identifiers in the contour data sets to identify corresponding vertices between the different contour data sets. For example, a vertex identifier identifies that vertex 606 for the contour data set at time A corresponds to artificially added vertex 610 for the contour data set at time B.

In some cases, a contour will disappear or appear between one frame or other data set and the next frame or other data set. The emergence or disappearance of contour can usually be detected by the failure of the processing module 172 to find a corresponding contour in the immediately following or preceding frame or other data set.

In one mode of operation, a position of emergence or disappearance is assigned to the contour in the immediately following or preceding frame or other data set. The position of emergence or disappearance can be determined from the expected movement of contours between data sets, for example determined from actual measured wind speeds or from the determined movement of other contours between the frames or other data sets.

Figure 8:
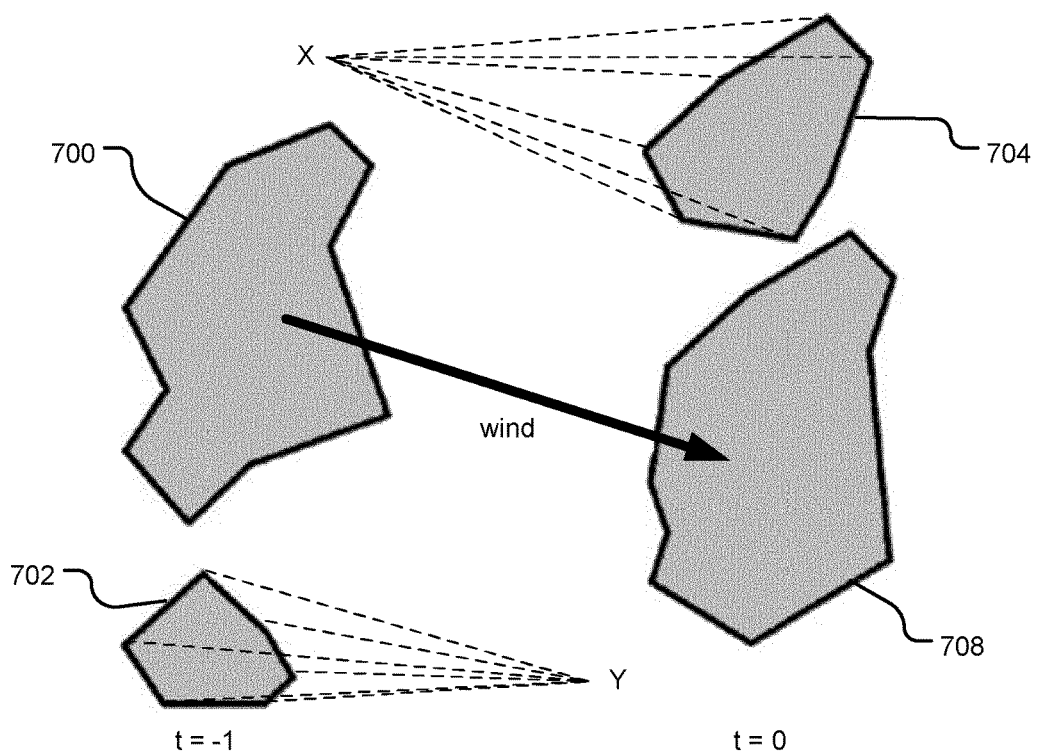
FIG. 8 is a plot showing the emergence and disappearance of contours at different times.

An illustration of the emergence and disappearance of contours is provided in FIG. 8, which shows contours present in a current frame (time, t=0) and in a previous frame (time, t=−1). There are two contours 700 and 702 representative of areas of precipitation present in a previous frame, at time t=−1. In the current frame, one of the contours 702 has disappeared and a new contour 704 has appeared. Contour 700 is present in the current frame as contour 708 although its shape has changed. The contour has moved due to the prevailing wind conditions.

In this case, the processing module 172 firstly finds correspondences between contours of the different frames by using a local wind vector representative of the measured wind speed and associates contours that overlap best. Thus, in FIG. 7 it is identified that contour 700 corresponds to contour 708 and represents the same area of precipitation.

Next, the processing module 172 determines that any leftover contours (in either frame) have appeared or disappeared. The location X of origin of contour 704 at time t=−1 is determined by following the local wind vector one frame interval backwards. Likewise, the location Y of disappearance of contour 702 is determined by following the local wind vector one frame interval forwards. Data identifying the locations X and Y are included in the frames or other data sets for transmission to the mobile devices.

It is possible that contour 700 corresponds to contour 704 rather than contour 708. However, it is more plausible the contour 700 corresponds to contour 708 because they overlap best if transposed by the local wind vector, as determined by processing module 172. It is possible that less obvious situations may arise, in which there is ambiguity as to which contours correspond to each other. However the system only requires a plausible solution. If the alternatives are completely equivalent, for example the overlap similarities equal in all respects, then the correspondence could be chosen randomly as either choice would be equally consistent with radar or other weather measurements.

The processing module 172 is able to perform processes such as identification of corresponding contour shapes in different frames, emergence or disappearance of vertices and contours, changes in contour topology (for instance splitting or merging contours) for example by intelligently selecting contour data sets, consistently defining contours and storing or transmitting information on the correspondence between vertices and contours in adjacent frames or other data sets. By performing such processes at the server 150 the processing burden at the navigation device 200 or another mobile device can be reduced.

It will therefore be appreciated that in the process of FIG. 5, the weather-related data received at the device 200 in an embodiment of the invention can comprise contour data. When the contour data comprises speed modification factor data, the contour data can comprise vertex coordinates that represents the positions of vertices of contours representing areas of equal speed modification factor, contour identifiers identifying contours that represent areas of the same speed modification factor, and vertex identifiers enabling the tracking of the corresponding contours between different data sets representing different times. Similarly, when the contour data comprises weather data, the contour data can comprise vertex coordinates that represents the positions of vertices of contours representing areas of the same or similar weather type and intensity, contour identifiers identifying contours that represent areas of the same or similar weather type and intensity, and vertex identifiers enabling the tracking of the corresponding contours between different data sets representing different times In other embodiments, the contour data sets received at the device 200 can represent areas for which a weather warning or other localised weather condition information has been issued. In some such embodiments, a fixed fragmentation of an area (for example a country or continent) into meteorologically meaningful regions that are expected, on average, to exhibit similar or homogeneous weather conditions is determined and stored at the server 150. In such embodiments, data representing the fragmentation of the area is also stored at the device 200 in the form of labelled contour data, for example labelled polygon definitions comprising, for instance, vertex coordinates.

In operation, upon receipt of weather warning or other weather condition data, the server 150 transmits only the labels of the currently affected regions along with the respective weather conditions specification (for example, an identifier specifying that the weather warning relates to heavy rain, strong wind or other weather condition). A unique identifier may be assigned to a particular weather warning. When the weather warning becomes obsolete, the server 150 is able to transmit a corresponding message indicating that the weather warning represented by the identifier is no longer current.

In an alternative embodiment, the server 150 determines whether the same weather warning or other weather condition applies to multiple adjacent regions. The server 150 then determines contour data representative of the outline of the adjacent regions merged together and transmits the contour data to the device 200. The device 200 then determines from the received contour data the area to which the weather warning applies.

Figure 9:
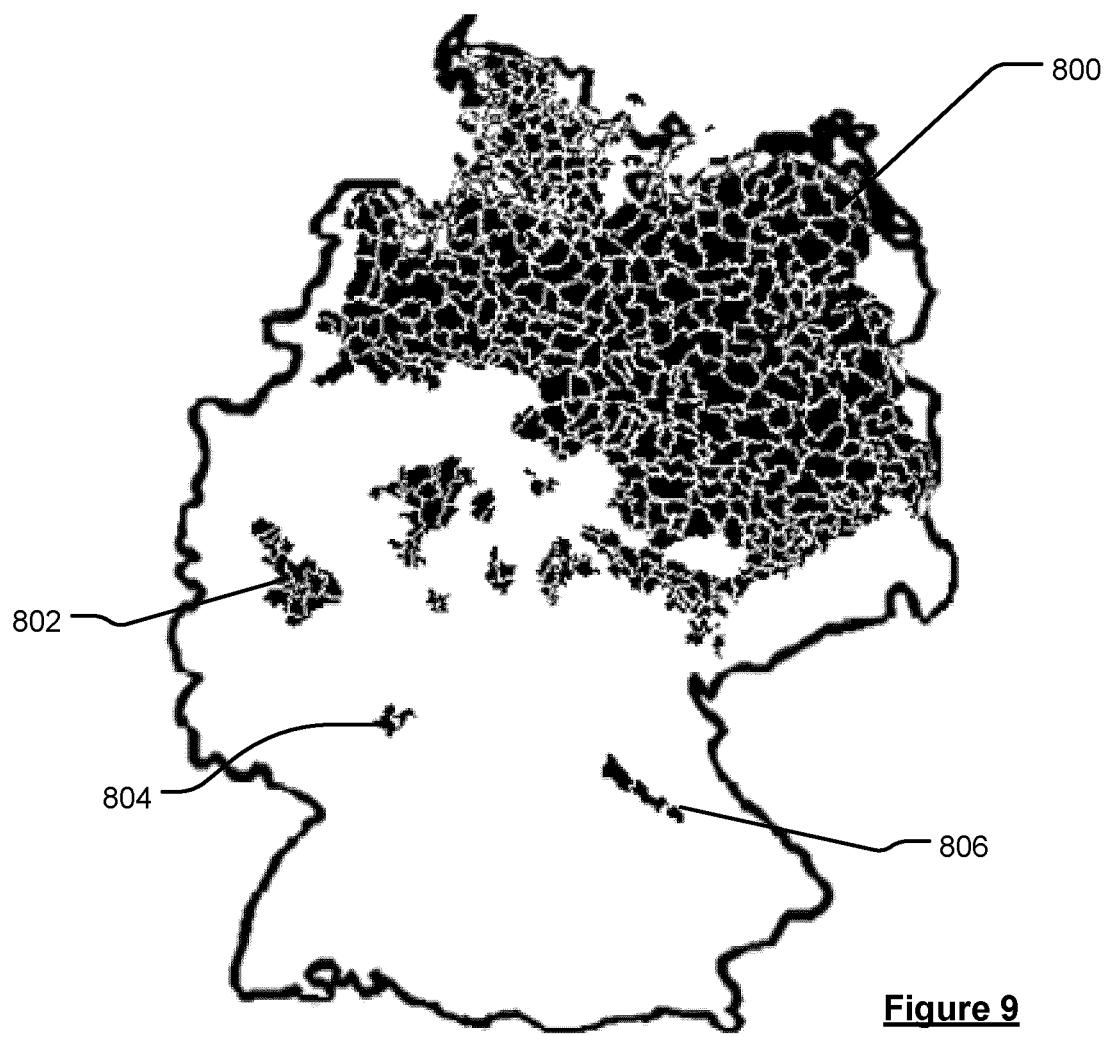
FIG. 9 is an image showing areas of a region for which a storm warning is current.

In a further alternative embodiment, the server decides on-the-fly for each area to which the weather warning or other weather condition applies whether it is more efficient (for example requires transmission of less data) to provide fixed region labels identifying the regions making up the area to which the warning or condition applies, or to provide contour co-ordinate data representing the area. The latter is likely to be more efficient when a large number of regions form an area with a simple shape. For example, in FIG. 9 a storm warning is current for the areas 800, 802, 804 and 806 of Germany. In this case, contour coordinates are transmitted to the device 200 representing area 800 which comprises a large number of contiguous regions, whereas region labels are transmitted to the device 200 representing areas 802, 804 and 806 (and other similar regions) which are made up of a smaller number of regions.

In another mode of operation, the processing of the data comprises transforming the data, e.g. using a Fast Fourier Transform (FFT) procedure, to represent the data as a plurality of coefficients. The coefficients are then filtered, and only those coefficients that are required to recreate an suitably accurate representation of the original data are transmitted to the device 200. The process will be described with reference to the transmission of weather data, but it will be appreciated that the process is equally applicable to the transmission of speed modification factor data. The use of a Fourier representation can be particularly suitable as an original function can be approximately reconstructed to a sufficient degree by only a subset of the original Fourier coefficients. In some modes of operation, based on the assumption that the original function is sufficiently smooth and therefore effectively band limited, it is possible to retain only the coefficients up to a maximum frequency in order to yield the desired compression.

In such embodiments the weather data processing module 172 in the server 150 (as shown in FIG. 1) is operable to perform a function fitting and/or transform procedure, as well as or instead of the above described contour data processing. Similarly, the data processing module 260 is operable to extract data from a received fitted function and/or to perform an inverse transform procedure, as well as or instead of the above described contour data processing.

Figure 10:
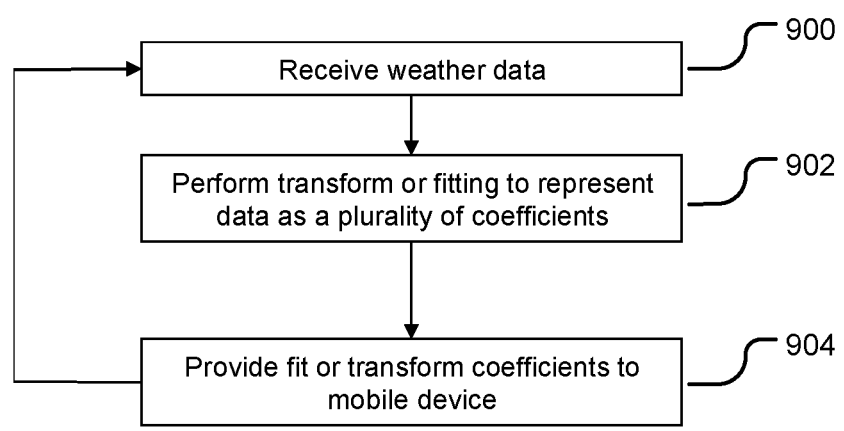
FIG. 10 is a flowchart illustrating an overview of a mode of operation of an embodiment.

Operation of the embodiment is illustrated in overview in the flowchart of FIG. 10.

At the first stage 900 of the process, the server 150 receives current weather data from the weather data source 180. The server 150 usually receives new weather data from the weather data source on a regular basis, for example every 15 minutes. The current weather data in this case comprises a set of weather data comprising the most recent measured weather data and sets of forecast weather data representing forecast weather conditions for times in the future, for example at 15 minute intervals for three hours in the future. As already mentioned, each set of weather data comprises a plurality of data points, each data point representing a weather condition (for example rainfall level) at a respective location in a region. The data points corresponds to regularly spaced positions across the region. The set of weather data may comprise or be used to generate a frame of weather data that can be used to display an image representing the weather condition for the region at a particular time.

In the process described in relation to FIG. 10, the weather data is rainfall data, although any other type of weather data can be used.

At the next stage 902, the processing module 172 performs a transform or fitting thereby to represent the received weather data as a plurality of coefficients. Any suitable fitting or transform can be used, depending on properties of the data, as will be described in more detail below. In the mode of operation now described in relation to FIG. 10 a Fourier transform is used.

The processing module 172 determines the number of data sets, T, included in the received current weather data. Each weather data set comprises an array P of data points of size m×n. The processing module 172 stacks the arrays P of the data sets to a three-dimensional array PP. The stacking of the arrays produces a three-dimensional array PP that represents complex, non-convex shapes of equal precipitation levels. As we are dealing with time and space the data can be reinterpreted as three-dimensional volumetric discrete data, for example a cube with values f(x,y,z). Optionally, the processing module 172 performs a smoothing process on the three-dimensional array PP to ensure sufficiently smooth level transitions from one two-dimensional array P to the next two-dimensional array P.

Next, the processing module 172 performs a Fast Fourier transform (FFT) procedure, thereby to fit the three dimensional data to a set of Fourier coefficients. The FFT procedure can be performed using standard Fourier library functions. In alternative embodiments any suitable Fourier transform, or indeed other transform or fitting procedures can be used. Embodiments are not limited to the use of FFTs, e.g. a discrete n-dimensional Fourier transform may be used.

The output of the FFT procedure is a set of Fourier coefficients that represents the three-dimensional data set PP comprising the weather data as a function of time and position. The set of Fourier coefficients can be used to reconstruct the set of weather data, and to extract weather data for any selected time or position.

The processing module 172 then performs a filtering process in which it selects some of the Fourier coefficients and discards other of the Fourier coefficients. In one mode of operation the processing module 172 selects those coefficients c that have a magnitude greater than a threshold value. In another mode of operation the processing module 172 selects coefficients for the first W of the N terms of the Fourier transform, where W is a threshold value. In a further mode of operation, an optimisation process is performed to select those coefficients that can best represent the data, subject to a constraint on the number of coefficients and/or on the quality of representation of the data. Any other suitable filtering or selection process can be used.

Figure 11:
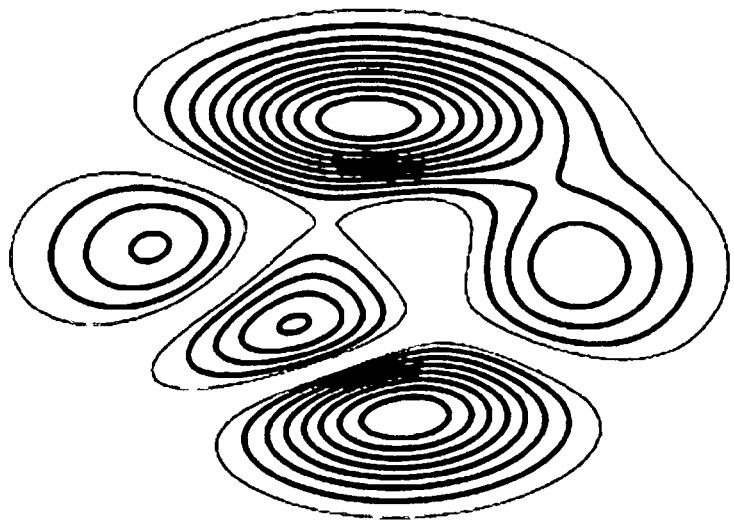
FIG. 11 is a plot showing precipitation as a function of position at a particular time.
Figure 12:
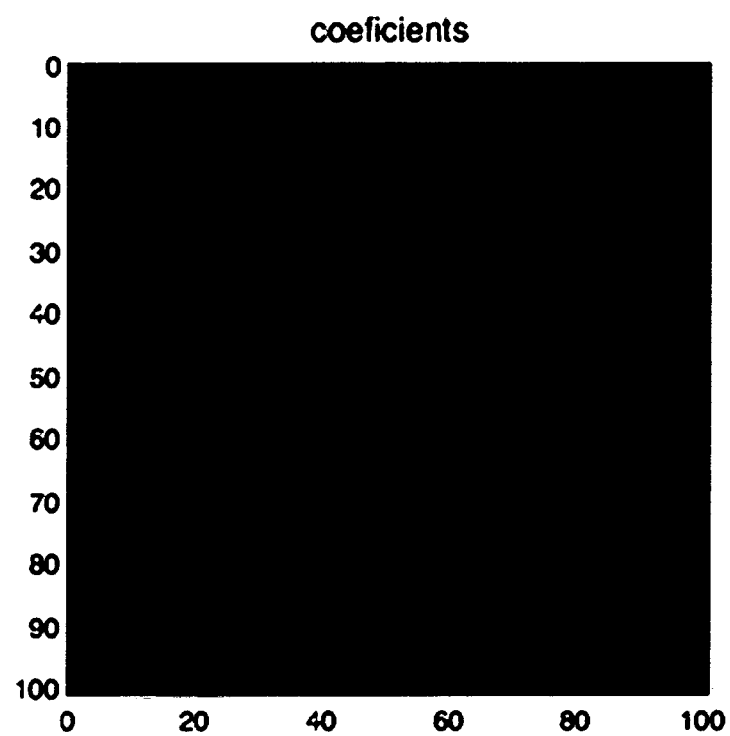
FIG. 12 is a plot representing selected Fourier coefficients obtained from a Fourier transform procedure performed on the data represented in FIG. 11.

By way of illustration, FIG. 11 is a plot of a single data set showing precipitation as a function of position at a single time. The plot includes contours that represent different rainfall levels. The FFT procedure is performed on the data set and FIG. 12 is a plot illustrating those Fourier coefficients that have been selected following the filtering process. In this case, all Fourier coefficients are selected and effectively no filtering has been performed.

Figure 14:
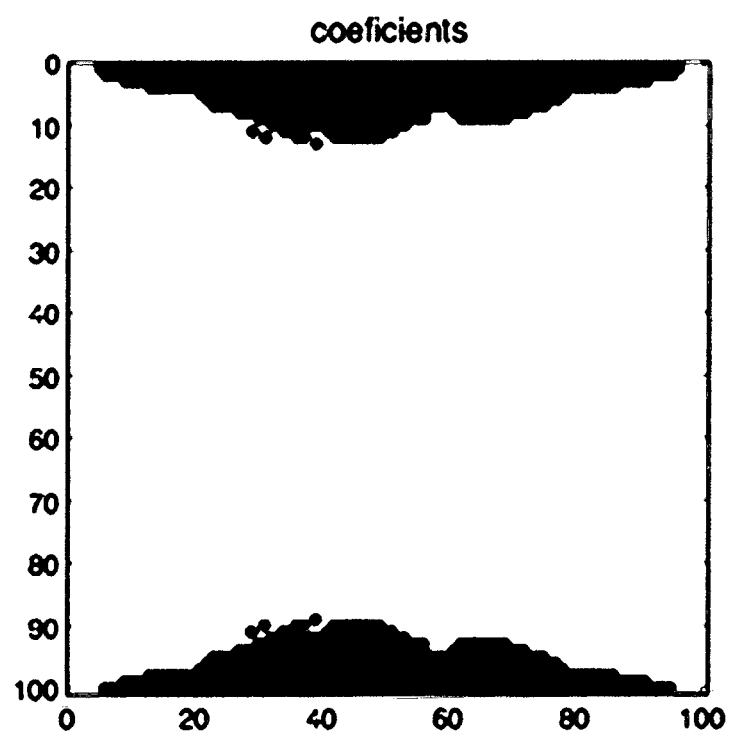
FIG. 14 is a plot representing the selected Fourier coefficients that were processed to obtain the plot of FIG. 13.

FIG. 14 is a plot illustrating those Fourier coefficients that have been selected following a filtering process to select only those coefficients that have a magnitude greater than 2.8. It can be seen from FIG. 14 that a large number of the coefficients have been discarded, and in this case the filtering provides a compression ratio of 8.72.

Figure 13:
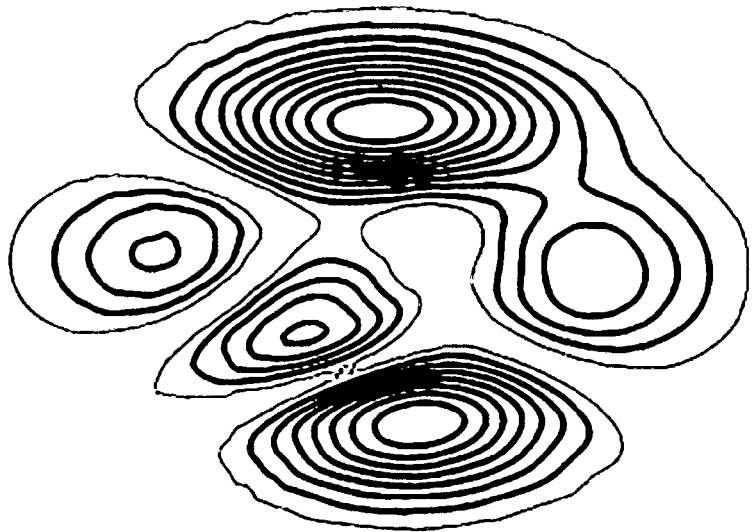
FIG. 13 is a plot showing precipitation as a function of position, obtained following an inverse Fourier transform procedure performed on selected Fourier coefficients.

FIG. 13 is a plot of precipitation data extracted by performing an inverse FFT using only the selected coefficients. It can be seen that there are some minor differences between the original data set of FIG. 11 and the reconstructed data set of FIG. 13. For example, there are some slight ripples in one of the contours of FIG. 13 that are not present in the corresponding contour of FIG. 11. However, for the purposes of, for example, providing weather data for use in navigation operations, e.g. route calculation, ETA estimation, etc, small distortions present in the reconstructed data are negligible and the Fourier transform and filtering processes do not produce any significant losses. The example of FIGS. 11 and 13 relate to a two-dimensional data set, for clarity of display of the results. However, similar results are obtained for three-dimensional data sets.

The selected Fourier coefficients are then transmitted to one or more mobile devices, for example the portable navigation device 200 (in step 904). The filtering process to be used to select coefficients for transmission to the devices can be selected in dependence on the properties of the data in question and/or in dependence on the available bandwidth for transmission to the devices. For example the number of coefficients that are selected for transmission can be varied in dependence on the available bandwidth.

The Fourier coefficients are received at the navigation device 200. The processing module 172 performs an inverse FFT to extract three-dimensional weather data representing rainfall as a function of position and time. Known library functions or routines can be used to perform the inverse FFT. In an embodiment, the processing module 172 is able to extract weather data for any selected position or time from the received Fourier coefficients, not only for the times represented by the original weather data sets.

In the process of FIG. 10, the processing module 172 uses the inverse FFT procedure to extract a series of data sets, each data set representing rainfall as a function of position across the region at a respective time. The extraction of each data set can be considered as the taking of a slice through a three-dimensional data set.

The use of the Fourier transform process, and the filtering or other selection of the coefficients, results in a significant reduction in the amount of data that is needed to be transmitted to the mobile devices, for example portable navigation devices, to represent actual and/or predicted weather conditions. For many applications that require transmission of weather-related data to mobile devices, the exact value of the weather data at any particular individual pixel may not be critical. Thus, considerable truncation or other filtering of the coefficients can be performed without significant loss in performance.

The Fourier transform and filtering process has been described with reference to FIG. 10 in relation to single sets of weather data representing the weather for an entire region (for example across an entire continent) at a particular time. In practice, a user of the navigation device or other mobile device may only need to receive weather data for an area in the vicinity of the location of the device or, for example, for an area around a planned route. Therefore, in some embodiments separate Fourier transform and filtering processes are performed on subsets of the weather data comprising weather data for selected sub-regions.

Figure 15:
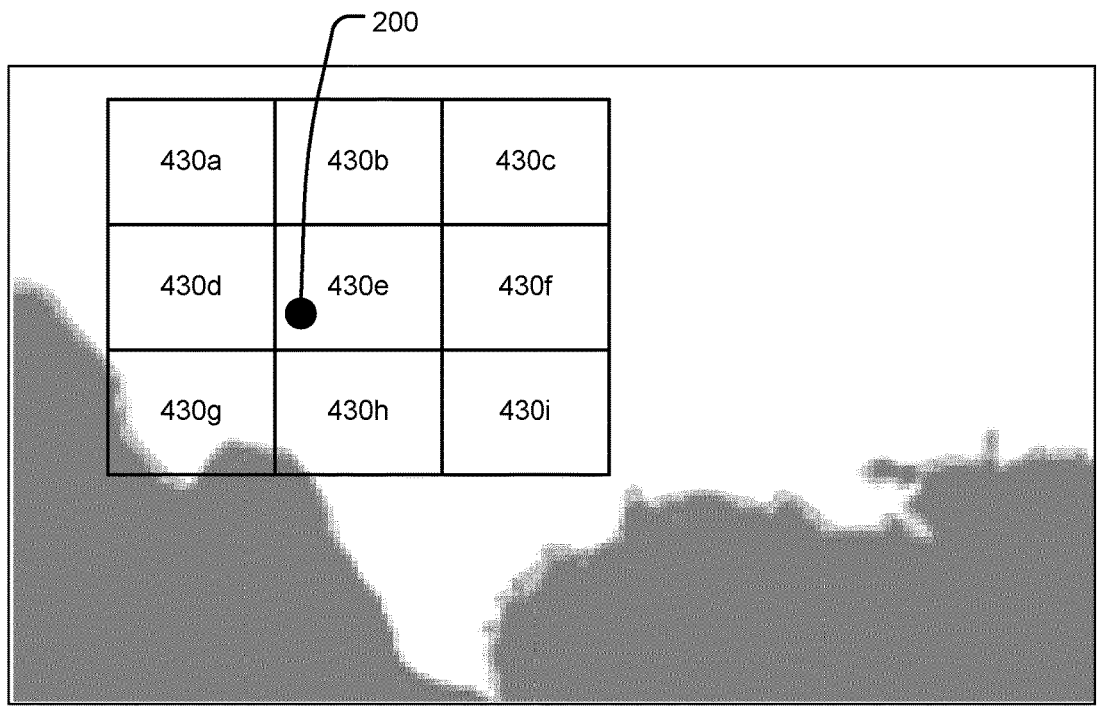
FIG. 15 is an image of a region showing sub-regions for which separate Fourier transform procedures are performed.

FIG. 15 is an illustration showing nine different sub-regions 430a-430i. A separate Fourier transform and filtering process is performed separately on weather data for each of the sub-regions, to produce nine different sets of selected Fourier coefficients. The location of a portable navigation device 200 is also indicated in FIG. 15. The portable navigation device 200 transmits its location to the server 150 and the server 150 selects the set of Fourier coefficients for the sub-region 430e in which the device is located and transmits those Fourier coefficients to the device 200. Weather data can be extracted by the device 200 from the received Fourier coefficients as already described. By transmitting only Fourier coefficients for a sub-region or sub-regions of relevance to a particular device the amount of data transmitted to the device can be reduced still further.

In practice, in the example described in relation to FIG. 15, the server 150 would in one mode of operation transmit four sets of Fourier coefficients, for sub-regions 430d, 430e, 430g, 430h, as the device 200 is close to the boundary of those four sub-regions. Although transmission of the four sets of Fourier coefficients can still provide a reduction in the amount of data transmitted to the device 200, the combining of the extracted weather data at the device 200 can be computationally cumbersome in some circumstances.

In practice the server 150 may be dealing with thousands or millions of active devices spread over the Earth. However, in the situation illustrated in FIG. 15 each set of Fourier coefficients represent weather data for only a single sub-region. Fourier coefficients for more than one sub-region may need to be transmitted if the device is close to a boundary between sub-regions. Fourier coefficients for many more sub-regions may need to be transmitted if the user of the device wishes to view or otherwise use weather data for a region larger than a single one of the sub-regions. Furthermore, to reduce the amount of data to be transmitted requires a sufficiently dense tiling of the sub-regions, but the smaller the size of the sub-regions the greater the probability that multiple neighbouring sets of weather data or images must be combined at the device 200, which can be computationally cumbersome as discussed.

Figure 16:
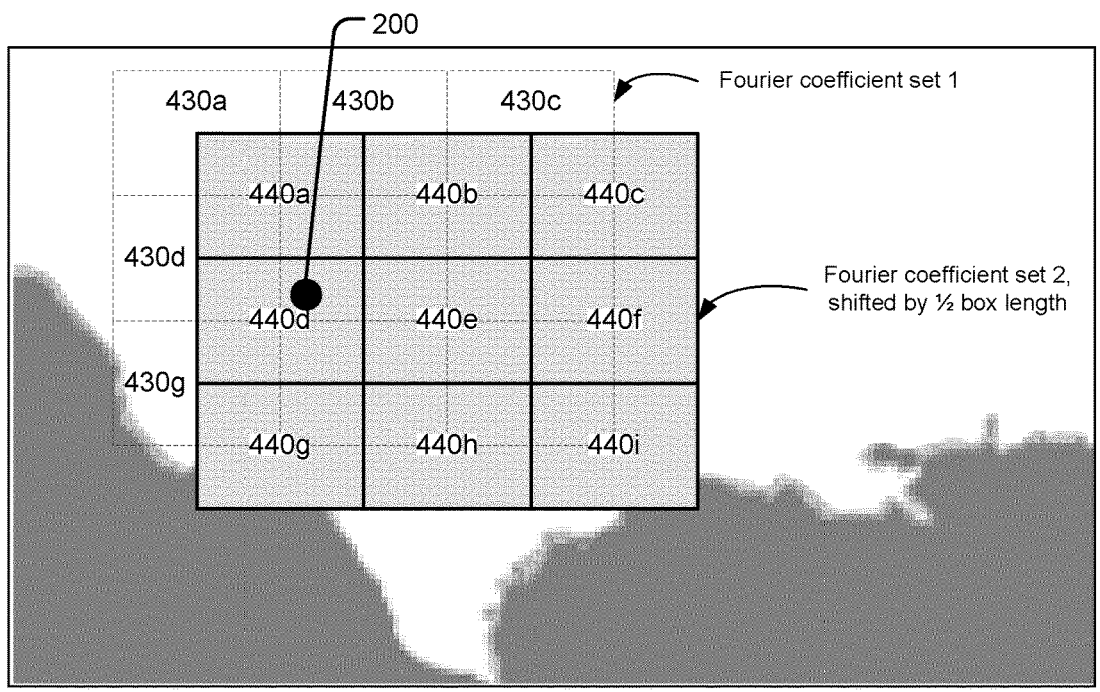
FIG. 16 is an image of a region showing two, shifted sets of sub-regions.

Operation of a further embodiment is described in relation to FIG. 16. In this case, the region is divided into two sets of sub-regions. Each set of sub-regions provides a tiling of the region, but each set is shifted against the other set by half of the length of a sub-region in x and y directions (or longitudinal and latitudinal directions). In FIG. 16, two sets of sub-regions 430a-430i and 440a-440i are shown.

In operation of the embodiment described in relation to FIG. 16, the device 200 again provides its location to the server 150. The server 150 then selects a sub-region within which the device 200 is located. There will be two sub-regions within which the device is located, in this case sub-regions 430e and 440d. The server 150 then selects the one of those two sub-regions for which the device is most distant from the boundary of the sub-region, in this case sub-region 440d. The server 150 then transmits the selected Fourier coefficients for the selected sub-region 440d to the device 200. The server 150 also transmits data representing the position, shape and size of the selected sub-region, or an identifier of the selected sub-region 440d enabling the navigation device 200 to determine the position, shape and size of the sub-region 440*d*. The device 200 is able to extract weather data for the sub-region 440*d* using an inverse FFT as already described.

In the embodiment of FIG. 16, the sub-regions of the different tilings are shifted by half a linear dimension (length or width) of a sub-region with respect to each other. However any suitable shift sizes can be used. For example in some embodiments there are three tilings, with sub-regions of each tiling being shifted by one third of a linear dimension of the sub-region. The pre-calculation of different sets of Fourier or other coefficients for different sub-regions for each update of weather information is readily achievable, given the computational power and memory available at the server 150.

The choice of the size of the sub-regions can be made by an operator at the server 150. The size of the sub-regions can also be referred to as a zoom level. Clearly, once the weather data is extracted at the device 200, the user at the device 200 can choose to display a subset of the extracted data, for example to zoom in further.

Different users often have different zoom level requirements. For example, a user of a device 200 may wish to view or otherwise use weather data for a continent or country as a whole, or may wish to view or otherwise use weather data for a specific region around the device 200. In some embodiments the amount of data to be transmitted to the devices 200 can be reduced by performing the Fourier transform and filtering or other selection processes at the server 150 for sub-regions of different sizes (and thus for different zoom levels). An example of the operation of such an embodiment is illustrated in FIG. 17.

Figure 17:
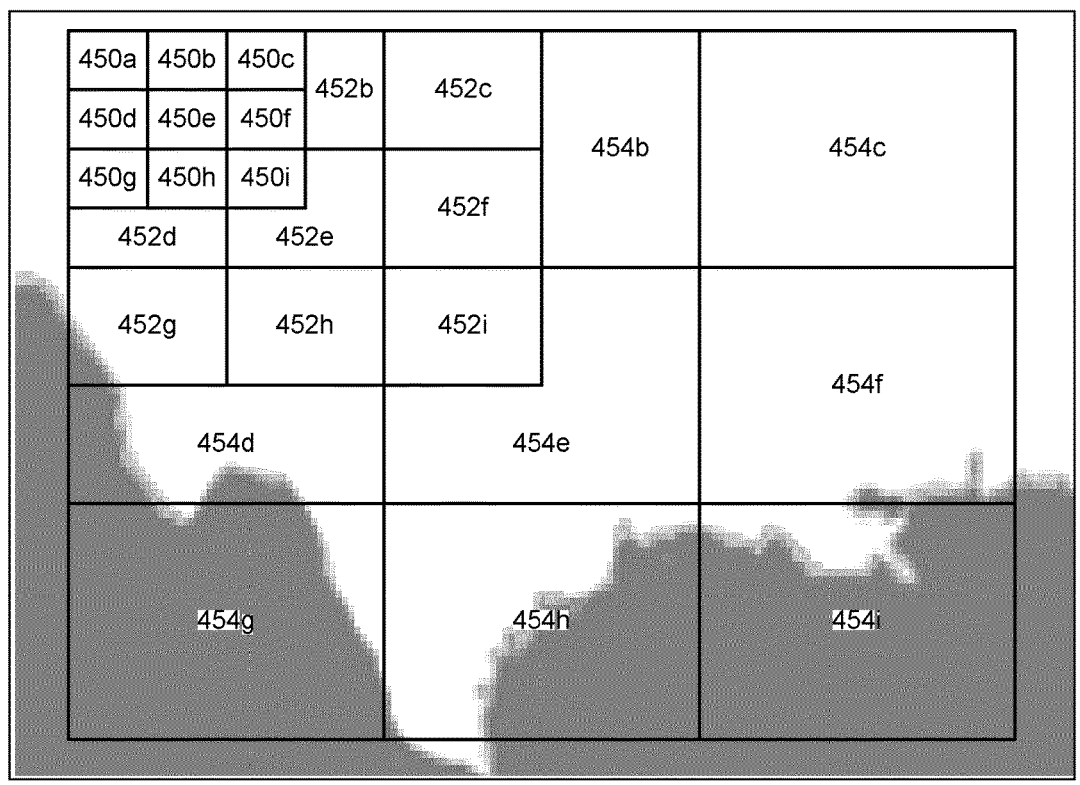
FIG. 17 is an image of a region showing three sets of sub-regions of different sizes.

In FIG. 17, a region is tiled with different sets of sub-regions, each set of sub-regions having sub-regions of different sizes/different zoom levels. In the case of FIG. 17, there are three separate tilings each with sub-regions of different sizes. The three separate tilings are represented by sub-regions 450*a*-450*i*, 452*a*-452*i* and 454*a*-454*i* in FIG. 17. Not all of the sub-regions of the tilings are shown, for clarity.

The server 150 determines the location of each device 200 and the zoom level required by that device 200, usually from data received from the device 200. In some cases a default zoom level may be set for each particular device, for example based on device type or previous user requests or settings for that device. The server 150 then selects the sub-region that most closely matches the device location and zoom level and transmits the selected Fourier coefficients for that sub-region to the device 200. The server 150 may also transmit a sub-region identifier and/or data representing the size and shape of the sub-region. The device 200 is able to extract weather data using an inverse Fourier transform procedure as already described.

In some cases, the server 150 may select a sub-region having a size/zoom level slightly smaller than that requested by the device 200*a* in order to avoid transmitting coefficients data for more than one sub-region.

In further embodiments, the server 150 calculates and selects Fourier coefficients for sub-region tilings having different sizes/zoom levels such as those described in relation to FIG. 17 and for shifts of those sub-region tilings such as those described in relation to FIG. 16. The server 150 selects the best sub-region for a particular device 200 based on the position of the device and/or requested zoom level from amongst the different tilings.

In alternative modes of operation, the server 150 may select a sub-region in respect of which to transmit Fourier coefficient data to a particular device based on data other than the current location of the device 200. For example, a user of the device 200 may request, via device 200, the data for another location than that at which the device is currently located. Alternatively or additionally, the server 150 may transmit coefficient data for sub-regions covering all locations along, and optionally within a predetermined margin of, a route to a selected destination of the navigation device 200.

In other alternative embodiments, below a certain density of data requests in time and space, coefficient sets are calculated individually for each device 200, on demand. This can give optimal data compression. In such embodiments the server 150 must be able to calculate, select and transmit the Fourier coefficients for each region or sub-region individually requested by devices within the period before the next weather update. If the server 150 is not able to achieve that target then it becomes more efficient to compute Fourier coefficients for predetermined tilings as already described. In such embodiments, the server 150 can switch between calculation of coefficients individually for each requesting device and calculation of coefficients for predetermined tilings in dependence on the level of demand. The level of demand is monitored periodically or continuously by the server 150. For regions where consistently few devices are present (for example central Australia, or Siberia) it is possible that on-demand calculation of coefficients will always be used.

The process described in relation to FIGS. 10 to 17 is described in relation to the transmission of rainfall data, but the process can be used to transmit any weather-related data or indeed any two-dimensional or three-dimensional data set having suitable properties. For example, the process can be used to transmit weather-related speed modification factor data rather than weather data. The speed modification factor data can be extracted for any desired time and position by performance of the inverse FFT at the device 200. The resulting speed modification factor data can be used to determine, for example, ETAs or routes, modified by actual expected weather conditions, using the processes as described in relation to FIGS. 1 to 6. In some cases, transmission of the speed modification factor data as FFT coefficients rather than as contour data can provide greater efficiency, particularly when it is required to determine speed modification factor data at times intermediate between those represented by the data sets processed at the server 150. The inverse FFT procedure enables determination of data, for example speed modification factor data, at such intermediate times without requiring the use of interpolation procedures as used in relation to contour data sets.

The embodiments described in relation to FIGS. 10 to 17 provide an efficient way of transmitting weather-related data or other suitable data to navigation devices, smart phones and any other suitable mobile devices over bandwidth limited connections. The embodiments, for example, do not require the tracking of contours, or their splitting and merging over time, and can exploit properties of combined frames or other data sets rather than compressing or transmitting such frames or other data sets individually.

The features of the Fourier transform approach that make it particularly suitable for many applications also apply to wavelet transforms, and in alternative embodiments or alternative modes of operation the server 150 uses a wavelet transform process rather than a Fourier transform process to determine the coefficients. Similarly the device 200 in such embodiments or modes of operation is configured to perform an inverse wavelet transform to extract the weather-related data or other data from the selected coefficients.

Alternative embodiments use transforms, fittings or other parametric representations instead of Fourier wavelet transforms. More specific prior knowledge of the characteristics of the function to be compressed motivate different representations that can allow for an even stronger compression for the purposes of a particular application. Targeting a more specific type of function, and alternative parametric representations need not be complete, i.e. it does not have to be able to construct every possible function to infinite precision. Rather, it is sufficient in practice that the typically expected target functions for a particular application can be approximated to the required degree. Furthermore, the parametrization does not have to be linear as in the Fourier case as long as feasible approaches for the transformation to and from the parameter space are available.

For example, in some embodiments or modes of operation the volumetric data is modelled by linear superposition of a fixed and finite set of 3-D Gaussian functions with different, but fixed, covariance matrices. For approximate reconstruction, only the scale weights and three-dimensional positions for a small subset of these bases functions are used. Alternatively, other suitable smooth volumetric functions can be used in place of Gaussian functions. An important aspect of this approach is that since the composition is linear, finding the optimal representation (for example using a least square error approach) of the original function can be achieved with the given set of basis functions can readily be obtained using straightforward linear algebra methodology.

Furthermore, reducing the complexity of such approximation can be achieved using standard methods for principal component analysis (PCA) such as the singular value decomposition (SVD) approach (this corresponds to applying a threshold to the coefficients in the Fourier based approach). Depending on the characteristics of the typical target function, a large library of basis functions may be required in order to achieve a desired accuracy. An advantage of the approach is that a reconstruction of the approximate function by the device 200 merely needs to linearly combine the (spatially translated) values of a fixed set of basis functions that can for example be stored in the form of simple lookup tables. The computational complexity of the reconstruction performed at the device 200 is thus low.

In a further alternative embodiment, the volumetric data can be modelled by linear superposition of a variable number of 3-D Gaussians of variable covariance matrix and position, whereby the number, covariance matrices, and positions of the Gaussians are selected to optimally matched the individual function at hand. In comparison to the embodiment described in the preceding paragraph the achievable accuracy of the representation is not limited by the choice of a finite set of basis functions. More precisely, since the number, positions and covariance matrices of the Gaussians are optimised for the given volumetric data, the accuracy of the approximation can be expected to be better and the number of Gaussians required is likely to be smaller than for the embodiment of the preceding paragraph. However, finding the optimal representation of a given target function according to the scheme is mathematically more involved, since the model is nonlinear in the coefficients of the covariance matrices and depends on the number of Gaussians. Nevertheless, since the problem is similar to, for example, the modelling of multimodal probability density in the field of statistical data analysis, numerous approaches from that area can be adapted for this application, such as for example the mean shift approach to finding a suitable number of Gaussians (cluster centres) and a modified k-means algorithm for determining the optimal positions of the Gaussians (cluster centres). Furthermore, the class of expectation-maximisation (EM) algorithms provides a general framework for performing parameter fits of the envisaged kind, and other iterative, nonlinear optimisation algorithms are applicable as well in further embodiments.

In contrast to the Fourier or wavelet transform approach, a further reduction of the representation's parametric complexity cannot easily be achieved a posteriori. Instead a limitation on the number of Gaussians allowed to model the original data is imposed during the fitting step. In the case of reconstruction of the data from the functions, the device 200a is configured to compute the values of Gaussian functions with variable covariance. The computational complexity of the reconstruction is thus higher than is the case for embodiments that use Gaussian functions with fixed covariance.

In some embodiments the server 150 and the device 200 are configured to use any of the described approaches for transforming or fitting the data, and for subsequently extracting the data. The approach to be used can be selected either manually or automatically in dependence on properties of the data and/or in dependence on which approach provides the best fit.

In the above described embodiments of the invention weather-related data received by a navigation device 200 is used to modify the speed profile associated with road segments of a digital map stored on the device. It is also contemplated, however, in addition to or as an alternative to modifying speed profiles that the received weather-related data causes particular road classification types to be excluded from navigation operations, e.g. route or ETA calculations, or given less weighting in navigation operations (e.g. by being changed, such as downgraded, to a different road type).

For example, in some embodiments, the processing module 260 excludes certain road types (e.g. minor roads), provides less weighting to such road types and/or downgrades such road types to a lower road type classification in route calculations if it is forecast that particular weather conditions may occur (for example, lying snow). Thus, major roads may be favoured if there is, for example, lying snow in anticipation that major roads may be subject to better or faster maintenance (for example, road clearing). Thus, a vehicle may be routed away from minor roads to major roads in the case of actual or forecast snow even if the fastest route under normal conditions may be via minor roads. Similarly, in the presence of snow or other such weather conditions, a route calculation may maintain a route on major roads even if a traffic jam is known to be present on major roads which, under normal weather conditions, would cause a rerouting to minor roads.

In such embodiments, the weather-related data is typically received periodically and often from a server via a mobile communications network. It also envisaged that such excluding or road type changing (e.g. downgrading) of road segments in a digital map may be as a result of a user input to the device 200. For example, in countries where there are large seasonal changes in weather, such as India, Malaysia and the like, certain road types can be used during certain seasons and are impassable during other seasons, such as the monsoon season (which can last for 3-4 months). For example, dry river beds may be used as roads in summer, but may be expected to be impassable or are more treacherous in winter.

Whilst embodiments described in the foregoing detailed description refer to GPS, it should be noted that the navigation device may utilise any kind of position sensing technology as an alternative to (or indeed in addition to) GPS. For example the navigation device may utilise using other global navigation satellite systems such as the European Galileo system. Equally, embodiments are not limited to using satellite-based systems but could readily function using ground-based beacons, inertial sensors, or any other kind of system that enables the device to determine its geographic location.

Whilst in embodiments described herein particular functionality is described as being provided at a server and other functionality is described as being provided at a device, for example at a PND or other mobile device, in alternative embodiments any of the described functionality can be provided at either a server or at a device. For example substantially all of the functionality is provided at a server in some embodiments, in which the server may operate as a navigation device. In other embodiments substantially all of the functionality is provided at a device, which may receive weather or other data directly from a source of such data rather than from the server.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

Whilst particular modules have been described herein, in alternative embodiments functionality of one or more of those modules can be provided by a single module or other component, or functionality provided by a single module can be provided by two or more modules or other components in combination.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

It will be understood that the present invention has been described above purely by way of example, and modifications of detail can be made within the scope of the invention.

Each feature disclosed in the description, and (where appropriate) the claims and drawings may be provided independently or in any appropriate combination.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A navigation apparatus comprising:
a processing resource configured to:
receive, for each of a plurality of road segments of a digital map, a classifier associated with the road segment, each classifier being one of a set of general classifiers of road segment properties;
receive weather-related data, the weather related data comprising a plurality of speed modification factors, each speed modification factor associated with a different classifier in the set of general classifiers, and each speed modification factor computed based on a weather condition and a reaction of roads having the corresponding classifier to the weather condition;
for each of the plurality of road segments, modify speed data for the road segment by:
using the classifier associated with the road segment to determine a selected speed modification factor from among the plurality of speed modification factors; and
modifying the speed data based on a product of an expected speed of travel for the road segment for normal conditions and the selected speed modification factor; and
perform a navigation operation using the modified speed data, wherein the navigation operation comprises at least one of determining and providing a route to a destination and determining and providing an estimated time of arrival (ETA).

2. Apparatus according to claim 1, wherein the weather-related data comprises data representative of expected weather conditions as a function of location, wherein the weather conditions comprise, for example, one or more of presence or amount of precipitation, for example rain, hail sleet or snow; wind speed and direction; presence or amount of lying snow; presence or amount of ice; level of visibility; presence or amount of fog; temperature.

3. Apparatus according to claim 1, wherein the weather-related data comprises at least one set of contour data, each set of contour data representative of a respective area of equal weather conditions or speed modification data, and the processing resource is configured to determine the weather-related data for a road segment from the position of the road segment and the contour data for that position.

4. Apparatus according to claim 1, wherein the processing resource is configured to determine an estimated time of arrival at the destination, and to modify the estimated time of arrival based on the modified speed data.

5. Apparatus according to claim 1, wherein the processing resource is configured to calculate a route to the selected destination in dependence on expected speed of travel, and to recalculate the route in response to the modification of the speed data.

6. Apparatus according to claim 4, wherein the processing resource is configured to modify the estimated time of arrival or to recalculate the route in dependence on a variation of the weather-related data over a period of time.

7. Apparatus according to claim 6, wherein the processing resource is configured to repeatedly receive updated weather-related data and to repeatedly modify the estimated time of arrival or repeatedly recalculate the route.

8. Apparatus according to claim 1, wherein the processing resource is configured to exclude or downgrade road segments having a selected road type in a route calculation process, in response to the occurrence of a particular weather type of the occurrence of a weather type of at least a predetermined severity.

9. Apparatus according to claim 1, wherein the processing resource is configured to exclude or downgrade road segments having a selected road type in a route calculation process, in response to an input from a user of the apparatus.

10. Apparatus according to claim 1, wherein the apparatus comprises a portable device.

11. Apparatus according to claim 10, wherein the portable device is configured to transmit data representative of at least one of the location of the portable device and the route to the selected location to a server, and the server is configured to select weather-related data in dependence on the at least one of the location of the portable device and the route and to transmit the selected weather-related data to the portable device.

12. A server system for providing weather-related data to at least one navigation apparatus, the server system comprising a processing resource configured to:
    obtain weather data;
    process the weather data to produce speed modification data, wherein the speed modification data comprises a plurality of speed modification factors, and wherein the processing comprises computing each speed modification factor based on a weather condition from the weather data and a reaction to the weather condition of roads having a corresponding classifier from a set of general classifiers; and
    transmit the speed modification data to the at least one navigation apparatus, wherein the speed modification factors in the speed modification data are configured to be used along with classifiers associated with road segments to compute speed data representative of an expected speed of travel due to weather conditions along the road segments.

13. A server system according to claim 12, wherein the weather data comprises data representative of the level of a particular weather type at a location, and the server is configured to apply a model, for example an exponential model, to determine the speed modification data for that location from the weather data.

14. A server system according to claim 12, wherein the processing resource is configured to correlate weather data and travel data for each of a plurality of road segments thereby to determine weather reaction data representing speed modification for each of the plurality of road segments as a function of at least one weather condition.

15. A server system according to claim 14, wherein the processing resource is configured to determine the speed modification data based upon the weather reaction data representing speed modification as a function of at least one weather condition, and current or forecast weather for the at least one road segment.

16. A method of performing a navigation operation, comprising:
    receiving, by a processor, for each of a plurality of road segments of a digital map, a classifier associated with the road segment, each classifier being one of a set of general classifiers of road segment properties;
    receiving weather-related data, the weather related data comprising a plurality of speed modification factors, each speed modification factor associated with a different classifier in the set of general classifiers, and each speed modification factor computed based on a weather condition and a reaction of roads having the corresponding classifier to the weather condition;
    for each of the plurality of road segments, modifying speed data for the road segment by:
        using the classifier associated with the road segment to determine a selected speed modification factor from among the plurality of speed modification factors; and
        modifying the speed data based on a product of an expected speed of travel for the road segment for normal conditions and the selected speed modification factor; and
    performing, by the processor, a navigation operation using the modified speed data, wherein the navigation operation comprises at least one of determining and providing a route to a destination and determining and providing an estimated time of arrival (ETA).

17. A non-transitory computer-readable medium comprising computer readable instructions that, when executed by a processing resource of a navigation apparatus, cause the navigation apparatus to perform a method comprising:
    receiving, by a processor, for each of a plurality of road segments of a digital map, a classifier associated with the road segment, each classifier being one of a set of general classifiers of road segment properties;
    receiving weather-related data, the weather related data comprising a plurality of speed modification factors, each speed modification factor associated with a different classifier in the set of general classifiers, and each speed modification factor computed based on a weather condition and a reaction of roads having the corresponding classifier to the weather condition;
    for each of the plurality of road segments, modifying speed data for the road segment by:
        using the classifier associated with the road segment to determine a selected speed modification factor from among the plurality of speed modification factors; and
        modifying the speed data based on a product of an expected speed of travel for the road segment for normal conditions and the selected speed modification factor; and
    performing a navigation operation using the modified speed data, wherein the navigation operation comprises at least one of determining and providing a route to a destination and determining and providing an estimated time of arrival (ETA).

18. A server system according to claim 14, wherein the processing resource is configured to determine the speed modification data based on a correlation of historical weather and travel data for the at least one road segment.

19. The computer-readable medium of claim 17, wherein the classifier is associated with each of the plurality of the road segment based at least in part on at least one of: width, number of carriageways, surface type, average speed or traffic volume under normal conditions, average speed or traffic volume under rush-hour conditions, urban or rural road location, proximity to a traffic junction or traffic lights.

20. The apparatus of claim 3, wherein the contour data comprises coordinates of each vertice of a fitted polygon, together with a contour value representing values of the speed modification factors represented by the contour data.

* * * * *

UNITED STATES PATENT AND TRADEMARK OFFICE
CERTIFICATE OF CORRECTION

PATENT NO.         : 9,830,815 B2
APPLICATION NO.    : 13/884029
DATED              : November 28, 2017
INVENTOR(S)        : Daniel Fulger, Peter Mieth and Steffen Gunther Wiesner It is certified that error appears in the above-identified patent and that said Letters Patent is hereby corrected as shown below:

On the Title Page

The Assignee should be listed as TomTom Navigation B.V.

Signed and Sealed this
Seventeenth Day of April, 2018

Andrei Iancu
*Director of the United States Patent and Trademark Office*